US010884677B2

(12) United States Patent
Kimura et al.

(10) Patent No.: US 10,884,677 B2
(45) Date of Patent: Jan. 5, 2021

(54) SHEET MANAGEMENT SYSTEM AND CONTROL METHOD TO DETERMINE WHETHER TO SET INFORMATION TO A SHEET HOLDING UNIT

(71) Applicant: CANON KABUSHIKI KAISHA, Tokyo (JP)

(72) Inventors: Yusuke Kimura, Abiko (JP); Nobuhiro Kawamura, Nagareyama (JP); Aya Ito, Tokyo (JP); Hideaki Ooba, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/453,858

(22) Filed: Jun. 26, 2019

(65) Prior Publication Data

US 2020/0004472 A1 Jan. 2, 2020

(30) Foreign Application Priority Data

Jun. 29, 2018 (JP) ................................. 2018-125528

(51) Int. Cl.
*G06F 3/12* (2006.01)
(52) U.S. Cl.
CPC .......... *G06F 3/1205* (2013.01); *G06F 3/1255* (2013.01)
(58) Field of Classification Search
CPC .... G06F 3/1205; G06F 3/1255; G06F 3/1286; G06F 3/1208; G06F 3/1232; G06F 3/121; G06F 3/1252; G06K 15/4065; G03G 15/5029; G03G 2215/00751
See application file for complete search history.

(56) References Cited

U.S. PATENT DOCUMENTS

| 2004/0141203 | A1* | 7/2004 | Honma | G06F 3/1205 |
| | | | | 358/1.15 |
| 2009/0189330 | A1* | 7/2009 | Saito | B65H 3/44 |
| | | | | 271/9.05 |
| 2019/0018631 | A1* | 1/2019 | Shinohara | G06K 15/186 |
| 2019/0322476 | A1* | 10/2019 | Miyazaki | G03G 15/5029 |

FOREIGN PATENT DOCUMENTS

| JP | 11-212424 A | 8/1999 |
| JP | 2005-144927 A | 6/2005 |

* cited by examiner

*Primary Examiner* — Iriana Cruz
(74) *Attorney, Agent, or Firm* — Canon U.S.A., Inc. I.P. Division

(57) ABSTRACT

A sheet management system, in which a print control apparatus and an image forming apparatus are configured to communicate with each other, includes a selection unit, an adjustment unit, a confirmation unit, and a setting unit. The selection unit selects a sheet feeding deck. The adjustment unit adjusts sheet information including setting values for performing print processing on a sheet to be used for printing. The confirmation unit confirms. In a case where there is not a match between selected sheet information set for the sheet feeding deck and the sheet information to be adjusted, the confirmation unit confirms whether the sheet information to be adjusted by the adjustment unit is to be set for the selected sheet feeding deck. The setting unit sets the sheet information adjusted by the adjustment unit for the image forming apparatus in accordance with a result of confirmation by the confirmation unit.

8 Claims, 25 Drawing Sheets

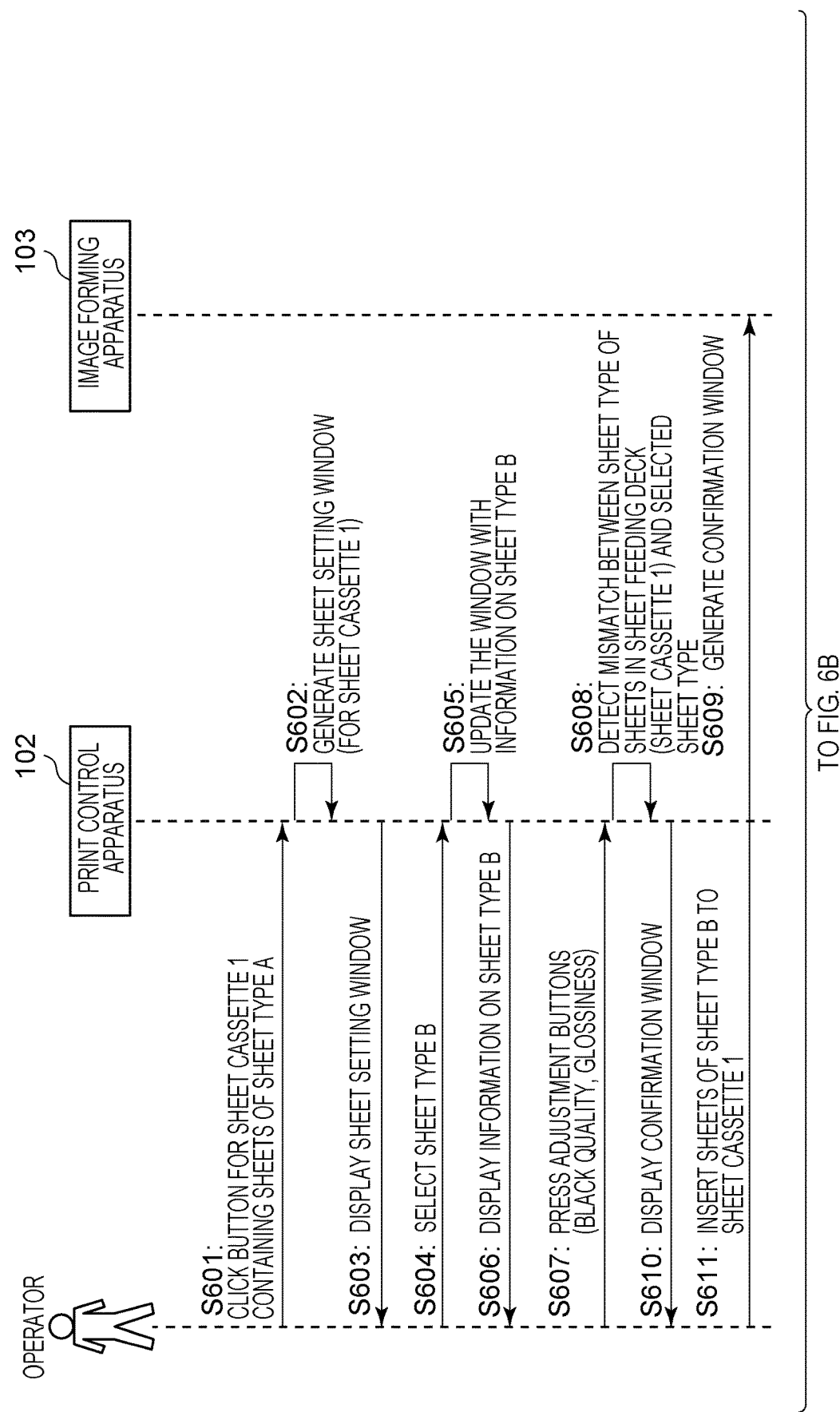

| NAME OF SHEET TYPE | SHEET TYPE ID | FAVORITE SHEET TYPE ID | USAGE HISTORY | SIZE | BASIS WEIGHT | GLOSSINESS/BLACK QUALITY CORRECTION LEVEL (FRONT SIDE) | GLOSSINESS/BLACK QUALITY CORRECTION LEVEL (BACK SIDE) | SETTABLE SHEET FEEDING DECK ID |
|---|---|---|---|---|---|---|---|---|
| SHEET TYPE A | 1 | NO SETTING | 123 | A4 | 75 | 0 | 0 | 1, 2, 3, 4, 5 |
| SHEET TYPE B | 2 | NO SETTING | 111 | A4 | 200 | 0 | 0 | 1, 2, 3, 4, 5 |
| SHEET TYPE C | 3 | NO SETTING | 50 | A4 | 100 | 0 | 0 | 1, 2, 3, 4, 5 |
| SHEET TYPE D | 4 | NO SETTING | 11 | A4 | 300 | 0 | 0 | 4, 5 |
| SHEET TYPE E | 5 | NO SETTING | 21 | A4 | 100 | 0 | 0 | 1, 2, 3, 4, 5 |
| ... | | ... | | | | ... | | |

820

| NAME OF SHEET FEEDING DECK | SHEET FEEDING DECK ID | SHEET TYPE ID | REMAINING NUMBER OF SHEETS |
|---|---|---|---|
| SHEET CASSETTE 1 | 1 | 1 | 25 |
| SHEET CASSETTE 2 | 2 | 3 | 25 |
| SHEET CASSETTE 3 | 3 | 5 | 25 |
| SHEET CASSETTE 4 | 4 | 3 | 25 |
| MANUAL FEED TRAY | 5 | 4 | 100 |
| ... | | | ... |

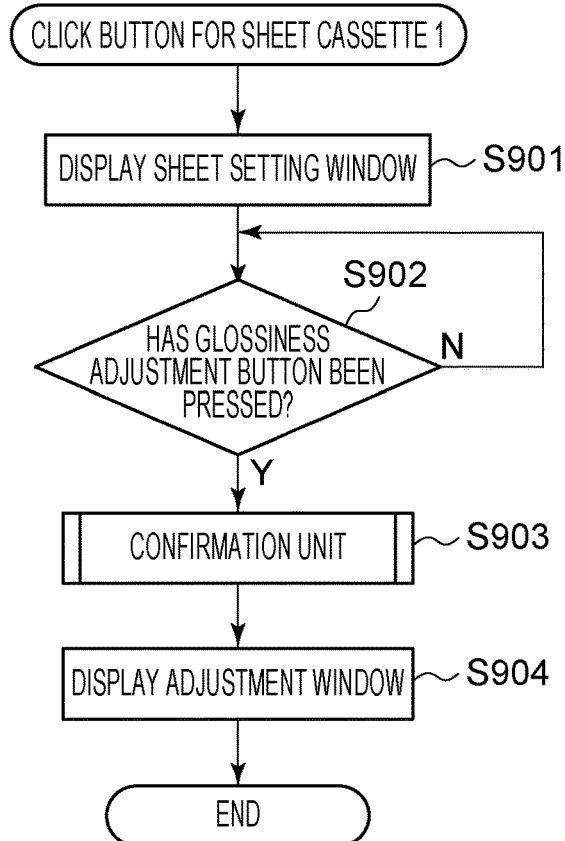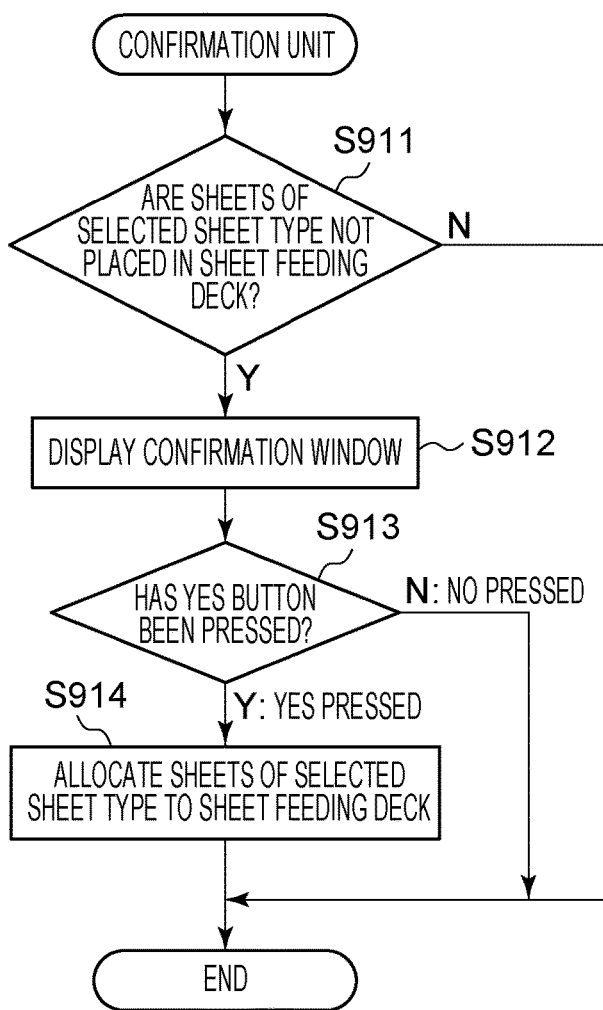
FIG. 9A
FIG. 9B

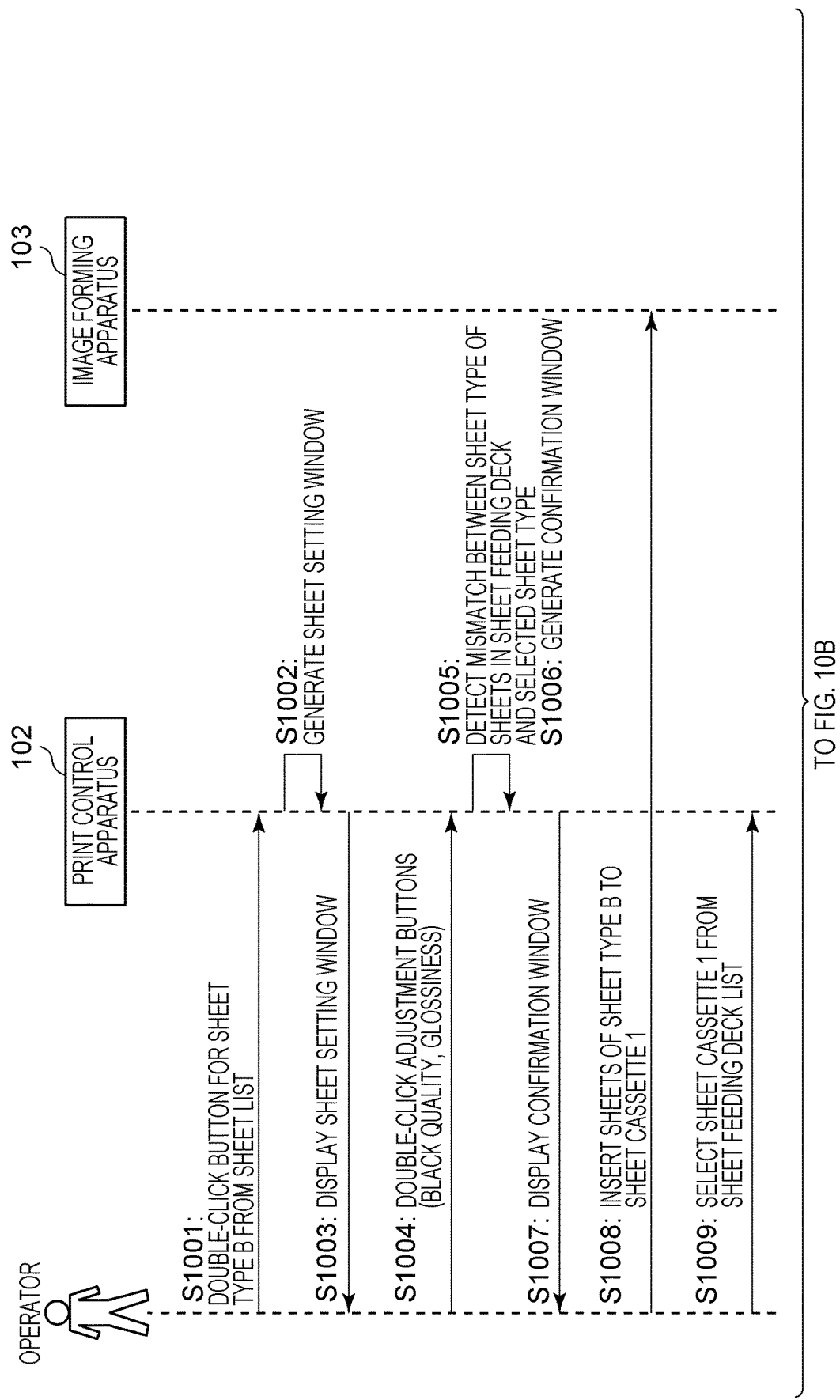

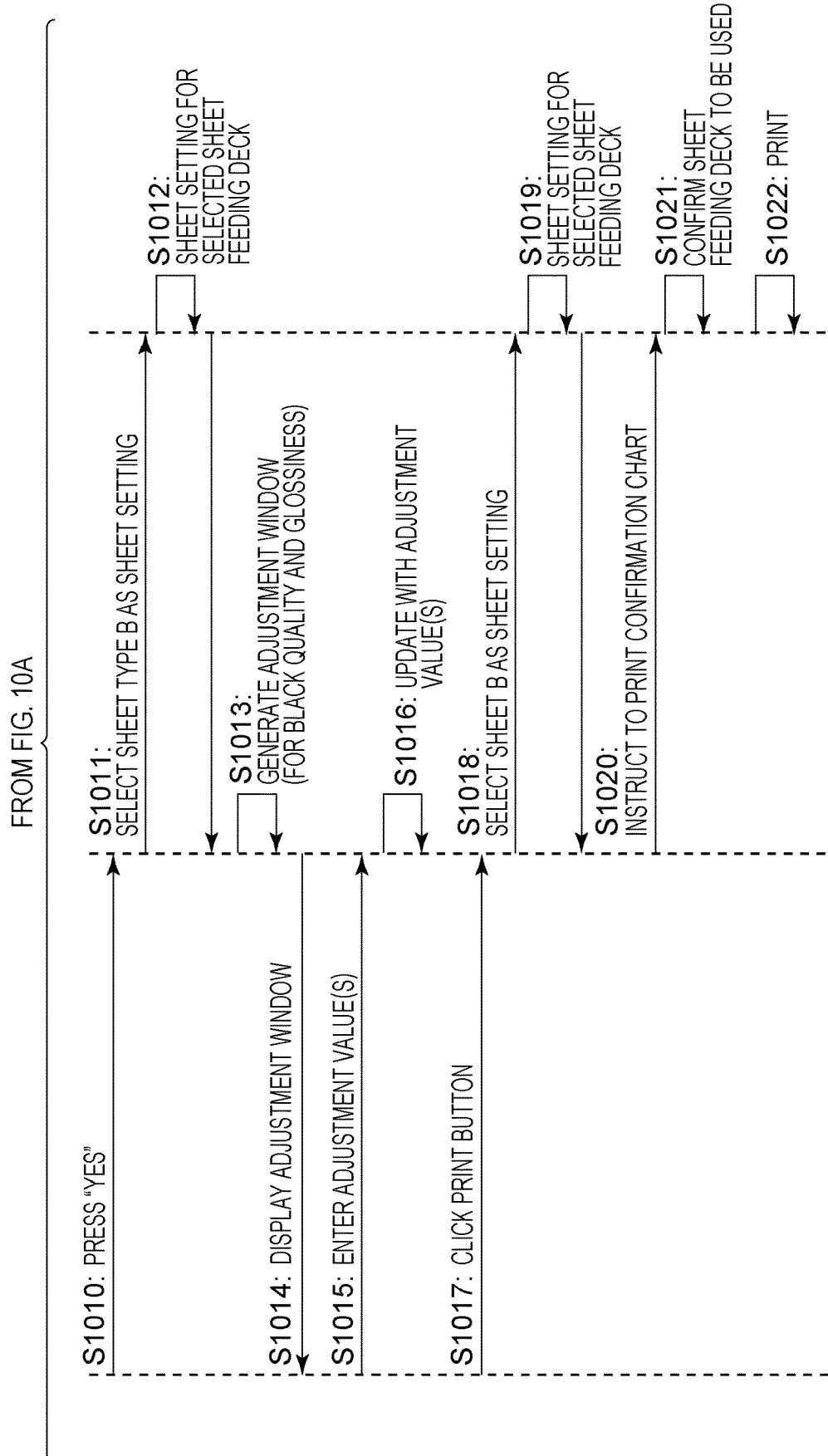

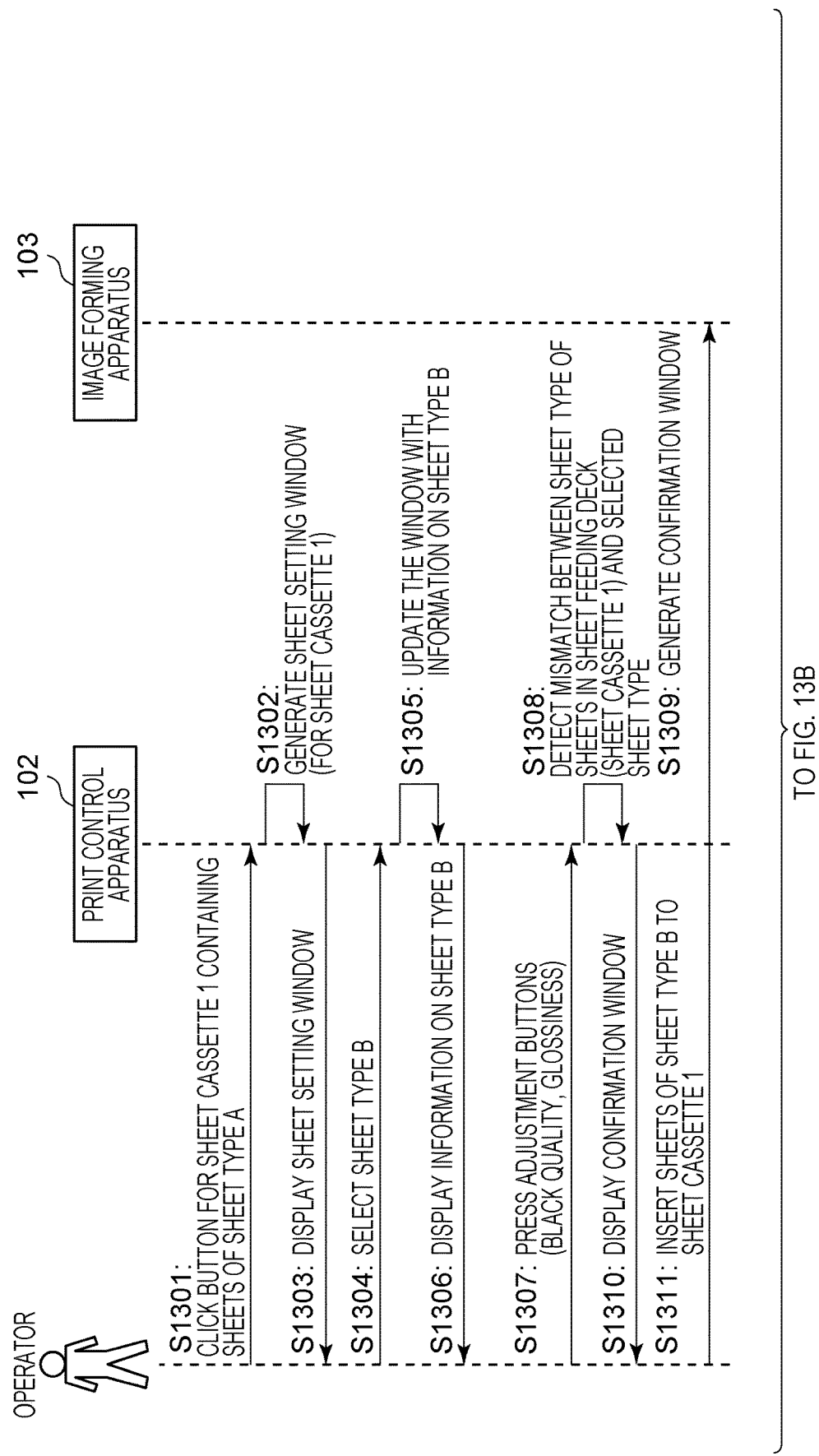

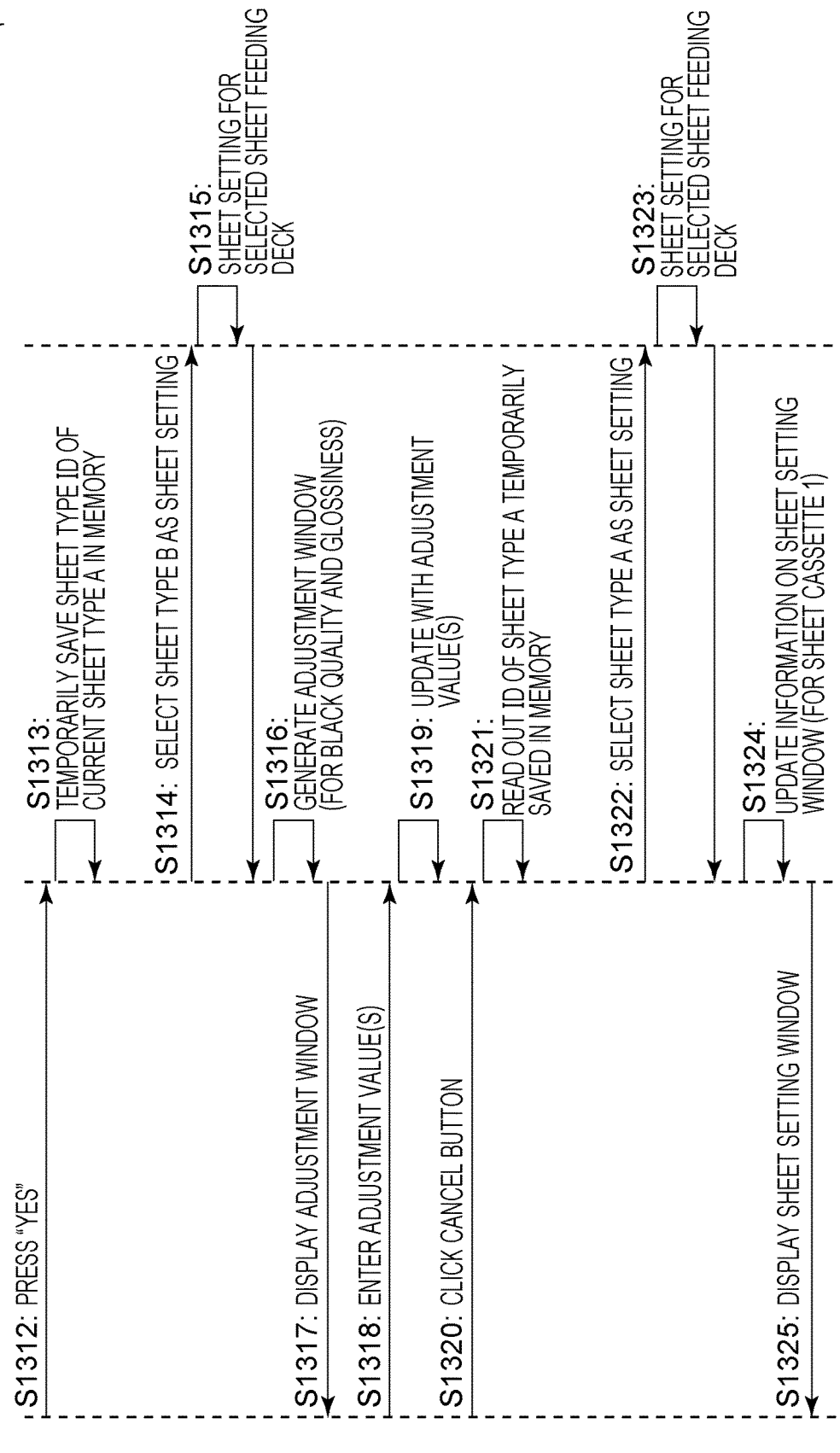

FIG. 14D

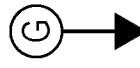

1430

SHEET CASSETTE 1

SHEET LIST:  DISPLAY ALL  ▼    [SEARCH SHEET TYPE]

| NAME | BASIS WEIGHT | SIZE | Y (WIDTH) | X ( |
|---|---|---|---|---|
| Supple McCoy Gloss Digital (... | 118 | A4 | 11.69 | 8.2 |
| Supple Opus Gloss Digital (1... | 148 | A4 | 11.69 | 8.2 |
| Supple McCoy Gloss Digital (... | 270 | A4 | 11.69 | 8.2 |
| Appleton Utopia two Gloss ... | 216 | A4 | 11.69 | 8.2 |
| Appleton Utopia two Gloss ... | 118 | A4 | 11.69 | 8.2 |
| Appleton Utopia two Gloss ... | 148 | A4 | 11.69 | 8.2 |
| Appleton Utopia two Gloss ... | 270 | USER SET SIZE | 5.83 | 16. |
| Xerox Docusource Index Ta... | 163 | | 0.00 | 0.0 |
| Xerox Docusource Index Ta... | 163 | | 0.00 | 0.0 |
| PLAIN PAPER 1 (80-90 g/m2) yyy | 85 | | 0.00 | 0.0 |
| ENVELOP (181-220 g/m2) test | 200 | WESTERN STYLE NO. 2 | 9.45 | 13. |
| test new engine param | 100 | A4 | 11.69 | 8.2 |
| test doublefeeddetectON | 100 | A4 | 11.69 | 8.2 |
| test | 100 | LTR | 11.00 | 8.2 |
| A5R media | 100 | A5R | 5.83 | 8.2 |
| min media | 100 | USER SET SIZE | 5.82 | 8.2 |
| PLAIN PAPER 1 (80-90 g/m2) 6 | 118 | | 0.00 | 0.0 |
| ooo | 87 | A5R | 5.83 | 8.2 |
| COLORED PAPER I (64-79 g/m2).444 | 100 | | 0.00 | 0.0 |
| SHEET TYPE A | 75 | A4 | 11.69 | 8.2 |
| SHEET TYPE B | 200 | A4 | 11.69 | 8.2 |
| SHEET TYPE C | 100 | A4 | 11.69 | 8.2 |
| SHEET TYPE D | 300 | A4 | 11.69 | 8.2 |
| SHEET TYPE E | 100 | A4 | 11.69 | 8.2 |

SHEET INFORMATION

NAME:
SHEET TYPE A

IMAGE POSITION ADJUSTMENT:
NO ADJUSTMENT                    [ADJUST...]

SECONDARY TRANSFER VOLTAGE ADJUSTMENT:
NO ADJUSTMENT                    [ADJUST...]

CURL CORRECTION AMOUNT:
NO ADJUSTMENT                    [ADJUST...]

GLOSSINESS/BLACK QUALITY ADJUSTMENT:
NO ADJUSTMENT                    [ADJUST...]

BACK END WHITE VOID CORRECTION:
NO ADJUSTMENT

SADDLE STITCHING SETTING:
NO ADJUSTMENT

ADJUSTMENT OF AIR FLOW OF SHEET SEPARATING FAN:
NO ADJUSTMENT                    [ADJUST...]

[ADJUST DETAILS...]

[OK]   [CANCEL]

→ Ⓖ

SHEET MANAGEMENT SYSTEM AND CONTROL METHOD TO DETERMINE WHETHER TO SET INFORMATION TO A SHEET HOLDING UNIT

BACKGROUND

Field

The present disclosure relates to a sheet management system and a control method.

Description of the Related Art

Before a digital multi-function peripheral, for example, is used, it is important to set the type and size of sheets placed in a sheet feeding deck through an operating unit. Through the operating unit, information on sheets actually placed in the sheet feeding deck is registered with sheet feeding deck information managed within an image forming apparatus so that a sheet can be conveyed properly to acquire a printed material. Therefore, every time the sheets placed in the sheet feeding deck are changed, it is important for an operator who uses the image forming apparatus to perform the operations for defining settings for the changed sheets. Also, before printing is executed, an adjustment operation is performed for satisfying desired print quality of the result. It is important for an operator to change adjustment values for a transfer voltage and correction levels for printing on a desired sheet in accordance with the property of the sheet. The adjustment operations for a sheet are important for acquiring a printed material.

As an example for improved convenience of an operator performing adjustment operations, a confirmation printing unit is provided that allows the operator to check whether adjustments have been performed properly. A system has been known by which a sheet feeding deck to be used for the confirmation printing is automatically selected in accordance with the performed adjustment works (see Japanese Patent Laid-Open No. 11-212424, for example).

SUMMARY

According to an aspect of the present disclosure, a sheet management system in which a print control apparatus and an image forming apparatus are includes a selection unit configured to select a sheet feeding deck, an adjustment unit configured to adjust sheet information including setting values for performing print processing on a sheet to be used for printing, a confirmation unit configured to confirm, wherein, in a case where there is not a match between sheet information set for the sheet feeding deck selected by the selection unit and the sheet information to be adjusted by the adjustment unit, the confirmation unit confirms whether the sheet information to be adjusted by the adjustment unit is to be set for the selected sheet feeding deck, and a setting unit configured to set the sheet information adjusted by the adjustment unit for the image forming apparatus in accordance with a result of confirmation by the confirmation unit.

Further features of the present disclosure will become apparent from the following description of exemplary embodiments with reference to the attached drawings.

BRIEF DESCRIPTION OF THE DRAWINGS

FIGS. 6A and 6B are diagrams illustrating an example of a sequence representing a processing example according to a first embodiment.

FIG. 8 illustrates examples of setting value tables relating to the processing example according to the first embodiment.

FIGS. 9A and 9B are diagrams illustrating an example of a flowchart representing the processing example according to the first embodiment.

FIGS. 10A and 10B are diagrams illustrating an example of a sequence representing a processing example according to a second embodiment.

FIGS. 11A to 11C are diagrams illustrating an example of a window transition relating to the processing example according to the second embodiment.

FIGS. 13A and 13B are diagrams illustrating an example of a sequence illustrating the processing according to a third embodiment.

FIGS. 14A to 14D are diagrams illustrating an example of a window transition according to the third embodiment.

DESCRIPTION OF THE EMBODIMENTS

Embodiments of the present disclosure will be described below.

Figure 1:
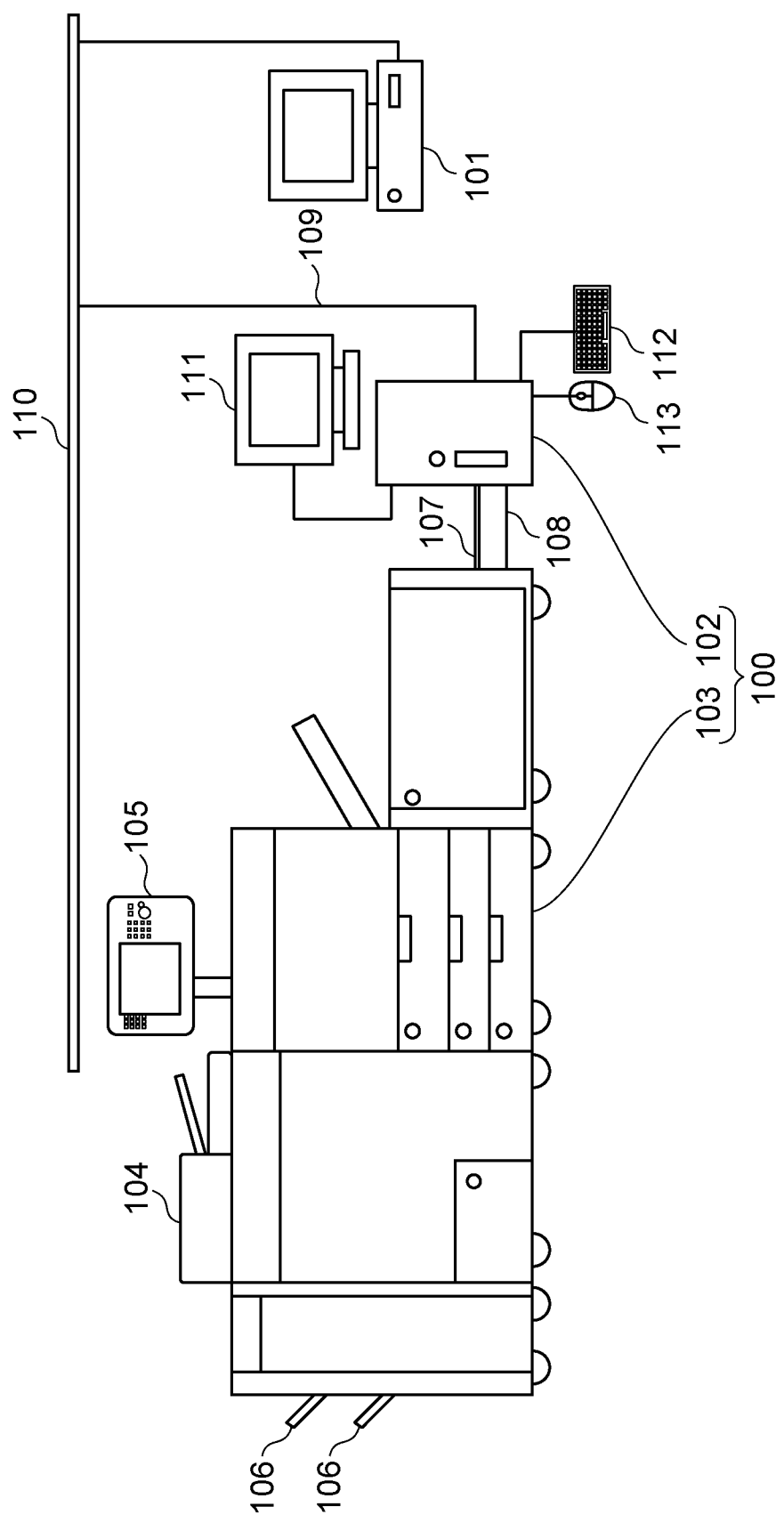
FIG. 1 is a block diagram illustrating a configuration example of a sheet management system.

FIG. 1 is a block diagram illustrating an overall configuration of a sheet management system 100. The sheet management system 100 in FIG. 1 includes an image forming apparatus 103 and a print control apparatus 102. The sheet management system 100 is communicably connected with a client computer 101. The client computer 101 and the print control apparatus 102 are communicably connected over a local area network (LAN) 110 by using an Ethernet (registered trademark) cable 109 or a comparable computer networking technology. The print control apparatus 102 and the image forming apparatus 103 are connected through a video cable 107 and a control cable 108. According to this embodiment, the image forming apparatus 103 is not directly connected with LAN 110. The image forming apparatus 103 and the client computer 101 communicate through the print control apparatus 102. The image forming apparatus 103 may be connected to the LAN 110. In other words, the image forming apparatus 103 may communicably and directly be connected with the client computer 101. Examples of the image forming apparatus 103 include a multi-function peripheral having printing and facsimile functions and a printer.

An application is activated in the client computer 101 to issue a print instruction to the sheet management system 100. The print control apparatus 102 performs image processing in cooperation with the image forming apparatus 103. The image forming apparatus 103 is a multi-function peripheral having various functions and not only may perform image processing instructed through the client computer 101 or the print control apparatus 102 but also may copy and transmit, to a shared folder, data read by a scanner unit 104. In order to scan an image by using the scanner unit 104, an operating unit 105 receives the corresponding instruction from a user through a key. The operating unit 105 displays information such as a scan state on a display. A sheet discharging unit 106 receives a sheet having an image thereon and discharges the received sheet. The print control apparatus 102 has a display device 111 such as a liquid crystal monitor. The print control apparatus 102 further has a keyboard 112 and a pointing device 113.

According to this embodiment, the sheet management system 100 will be described as including the print control apparatus 102 and the image forming apparatus 103 separately. However, functions of the print control apparatus 102 may be internally provided in the image forming apparatus 103, and the print control apparatus 102 may not physically be provided. The display device 111 may have a function as a position input device such as a touch pad and may also function as the pointing device 113.

Figure 2:
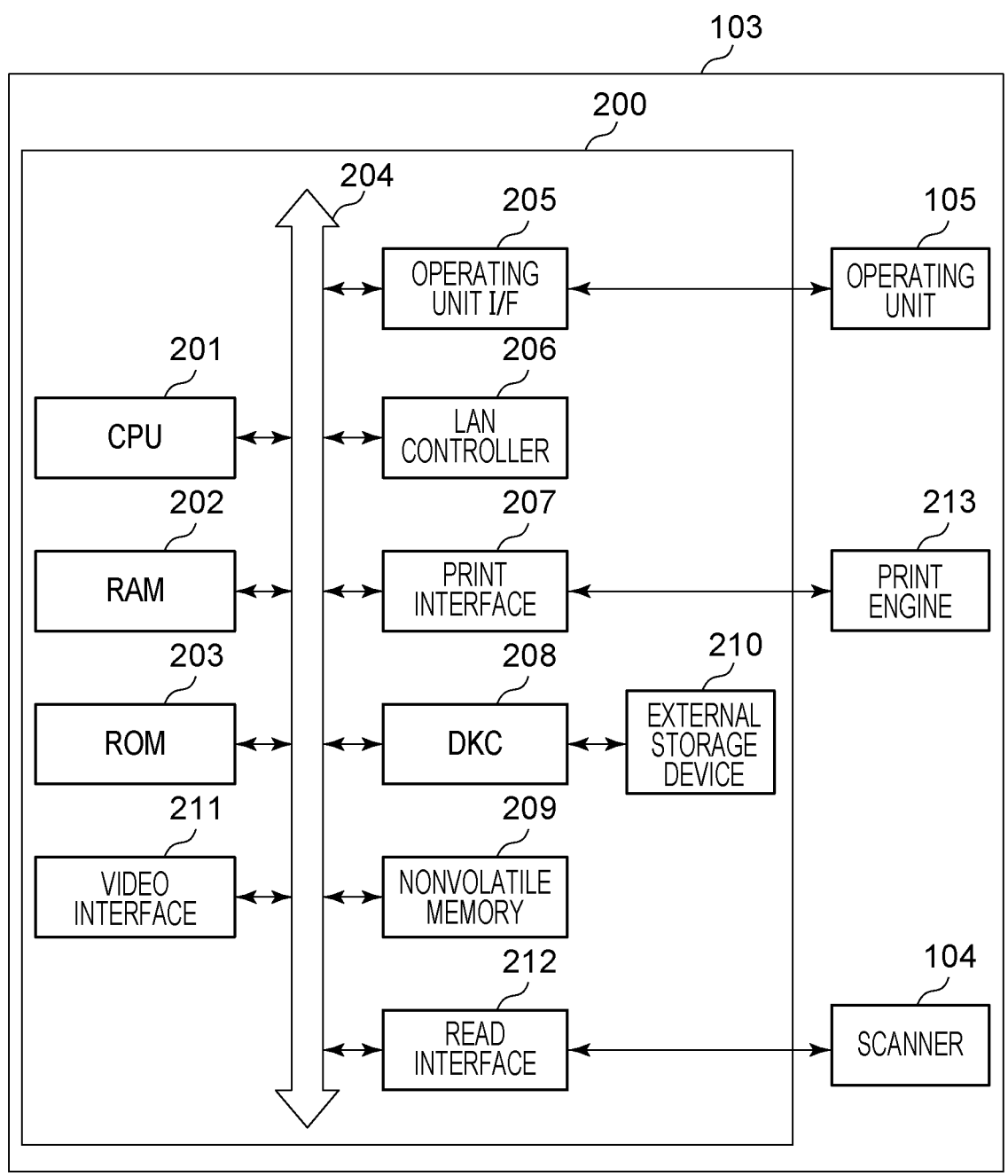
FIG. 2 is a block diagram illustrating a hardware configuration of an image forming apparatus.

FIG. 2 is a block diagram illustrating a hardware configuration of the image forming apparatus 103. Referring to the block diagram illustrating the image forming apparatus 103 in FIG. 2, a controller 200 controls the image forming apparatus 103 and includes a CPU 201 to a read interface 212. The CPU 201 generally controls accesses to and from devices connected to a system bus 204 based on control programs stored in a ROM 203 or an external storage device 210. The CPU 201 further outputs an image signal as output information to a print unit (print engine) 213 connected to the system bus 204 through a print interface 207 and controls an image signal input from the reading unit (scanner) 104 connected to the system bus 204 through the read interface 212. The CPU 201 can perform processing for communicating with the print control apparatus 102 through a LAN controller 206. A RAM 202 mainly functions as a main memory, a work area, and a video memory, for example, for the CPU 201. Accesses to the external storage device 210 such as a hard disk (HDD) or an IC card are controlled by a disk controller (DKC) 208. The external storage device 210 stores an application program, font data and form data, for example, and is used as a job storage area in which a print job is temporarily spooled and the spooled job is externally controlled. The external storage device 210 is further used as a hold-printing data storage area in which image data acquired by reading an image by the scanner 104 or image data of a print job are held as hold-printing data and which is referred over a network for printing. According to this embodiment, the external storage device 210 is an HDD and holds logs such as job logs and image logs. An operating unit interface (I/F) 205 receives information input through the operating unit 105 (such as a software key or a hardware key) by a user and transmits a window display control signal. A nonvolatile memory 209 stores setting information defined from a terminal through the operating unit 105 or over a network. A video interface 211 receives image data from the print control apparatus 102.

Figure 3A:
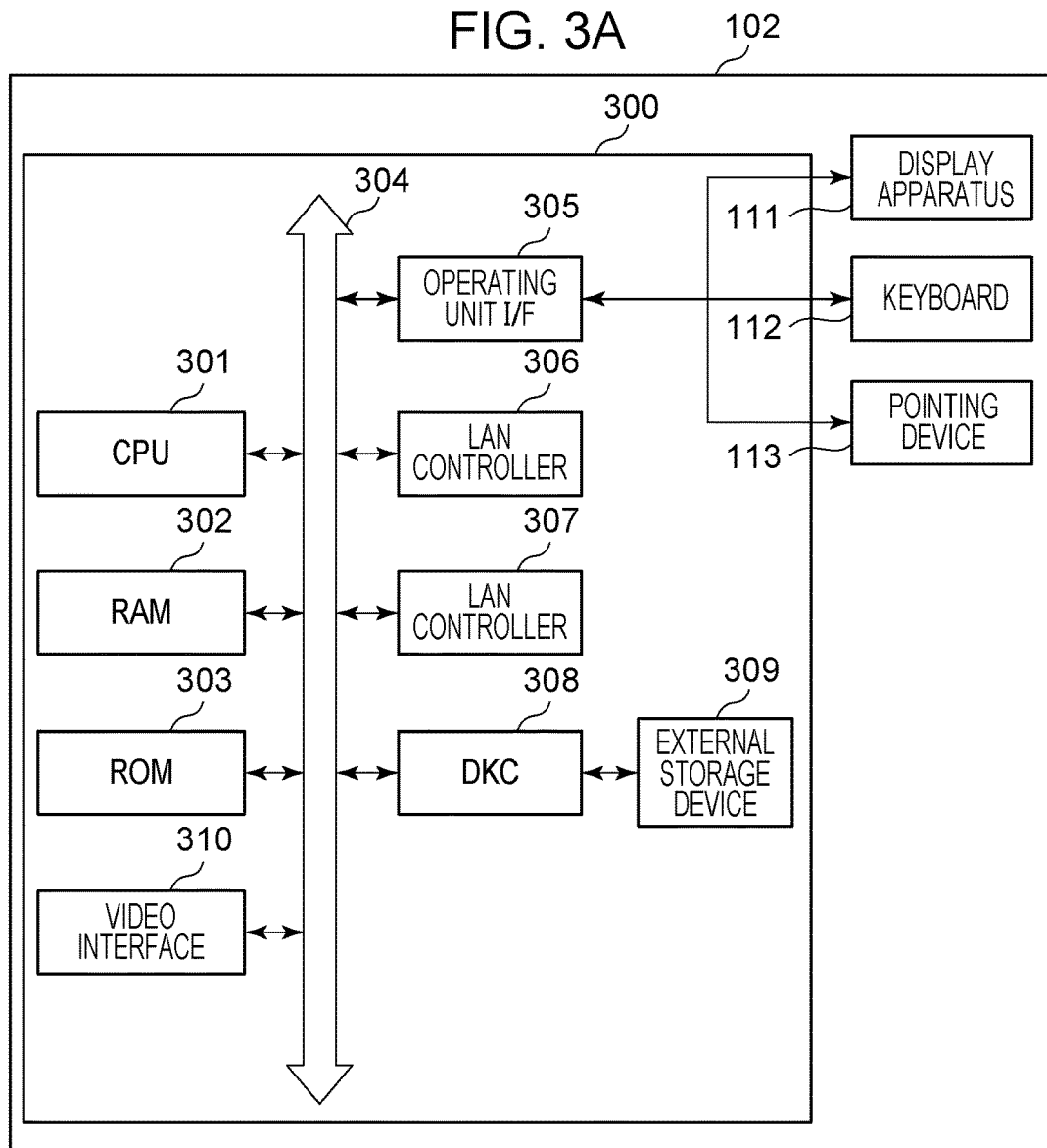
FIGS. 3A and 3B are block diagrams illustrating hardware and software configurations of a print control apparatus.

FIG. 3A is a block diagram illustrating a hardware configuration of the print control apparatus 102. Referring to the block diagram illustrating the print control apparatus 102 in FIG. 3A, the controller 300 controls the print control apparatus 102 and includes a CPU 301 to a video interface 310. The CPU 301 generally controls accesses to and from devices connected to a system bus 304 based on control programs stored in a ROM 303 or an external storage device 309. The CPU 301 can perform processing for communicating with the image forming apparatus 103 through a LAN controller 306. The CPU 301 can perform processing for communicating with the client computer 101 and the image forming apparatus 103 on the network through a LAN controller 307. A RAM 302 mainly functions as a main memory, a work area, and a video memory, for example, for the CPU 301. Accesses to the external storage device 309 such as a hard disk (HDD) or an IC card are controlled by a disk controller (DKC) 308. The external storage device 309 stores an application program, font data, and form data, for example, and temporarily spools a print job. The external storage device 309 is used as a job storage area in which the spooled job undergoes raster image processor (RIP) processing and the result is saved again. An operating unit interface (I/F) 305 receives information input through an operating unit (keyboard 112 or pointing device 113) by a user and transmits a window display control signal for the display device 111. The video interface 310 transmits image data as a result of the RIP processing to the image forming apparatus 103.

Figure 3B:
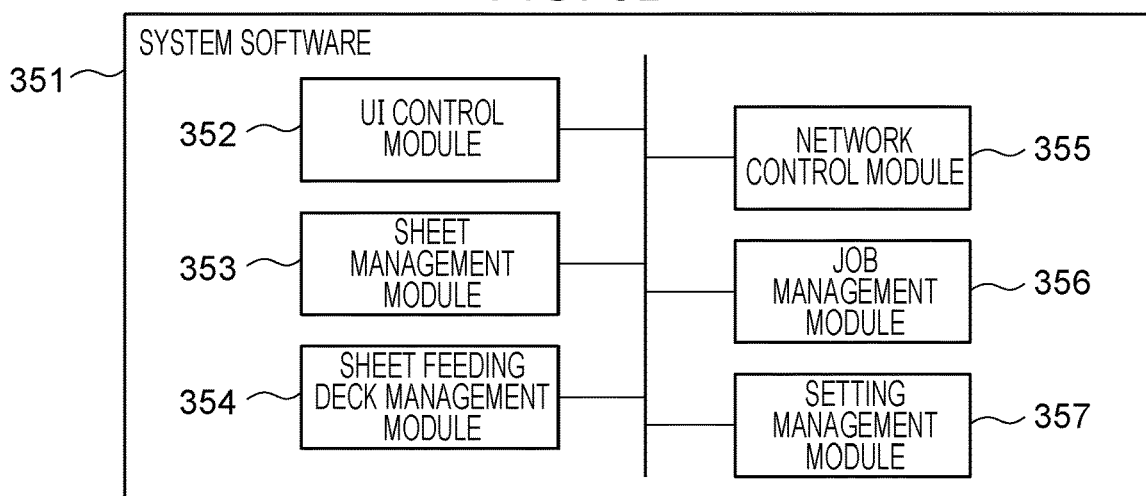

FIG. 3B is a block diagram illustrating a software configuration of the print control apparatus 102. Modules in FIG. 3B are stored in the external storage device 309 in FIG. 3A. The modules are decompressed in the RAM 302 and are executed by the CPU 301. System software 351 configured to control the print control apparatus 102 includes a user-interface (UI) control module 352, a sheet management module 353, a sheet feeding deck management module 354, a network control module 355, a job management module 356, and a setting management module 357.

The UI control module 352 is a module that controls windows to be displayed by the sheet management system. The UI control module 352 can control to change the words displayed on windows and the display unit system for a sheet size based on system settings.

The sheet management module 353 is a module configured to communicate with the image forming apparatus 103 and manage sheet information obtained through the communication in a sheet settings management table 810 in FIG. 8. The sheet management module 353 can edit, add, delete, and search sheet information on the sheet settings management table 810. The sheet settings management table 810 is a management table for managing sheet information for each sheet type ID and is managed in the external storage device 309 that is a nonvolatile area. Having described that the sheet settings management table 810 is managed in the external storage device 309, it may be managed in the external storage device 210 in the image forming apparatus 103. In this case, the print control apparatus 102 may obtain the sheet settings management table 810 from the image forming apparatus 103 and may store it in the RAM 302 during execution of a program.

The sheet feeding deck management module 354 is a module configured to communicate with the image forming apparatus 103 and manage sheet feeding deck information obtained through the communication in a sheet feeding deck setting management table 820 in FIG. 8. Although the information in FIG. 8 is also stored in the external apparatus 309, it is not illustrated in FIG. 3B. The sheet feeding deck management module 354 can edit, add, delete, and search sheet feeding deck information on the sheet feeding deck setting management table 820. The sheet feeding deck setting management table 820 is a management table for managing sheet feeding deck information for each sheet feeding deck ID and is managed in the external storage device 309 that is a nonvolatile area. The sheet feeding deck setting management table 820 may be managed in the external storage device 210 in the image forming apparatus 103, and the print control apparatus 102 obtains the sheet feeding deck setting management table 820 from the image forming apparatus 103 and may store it in the RAM 302 during execution of a program.

The network control module 355 is a module that controls processing for communicating with the image forming apparatus 103 through the LAN controller 306 and with the client computer 101 on the network through the LAN controller 307.

The job management module 356 is a module that manages a print processing sequence and order of jobs. The job management module 356 manages a job received by the print control apparatus 102 and controls transfer of data for printing the received job to the image forming apparatus 103 through the LAN controller 306 and the video interface 310.

The setting management module 357 is a module that manages system settings relating to the sheet management system 100 and favorite information. The setting management module 357 manages favorite information in a favorite setting management table. The setting management module 357 can edit, add, delete, and search favorite information on the favorite setting management. The system settings include a setting for a language of the words displayed on a window and a setting for a display unit system (such as millimeter or inch) for a sheet size, for example, in the sheet management system 100. A setting management table is provided as a management table for managing setting information for the sheet management system 100 and is managed in the external storage device 309 that is a nonvolatile area. Having described that the setting management table is managed in the external storage device 309, the setting management table may be managed in the external storage device 210 in the image forming apparatus 103, and the print control apparatus 102 obtains the setting management table from the image forming apparatus 103 and stores it in the RAM 302 during execution of a program.

Figure 7A:
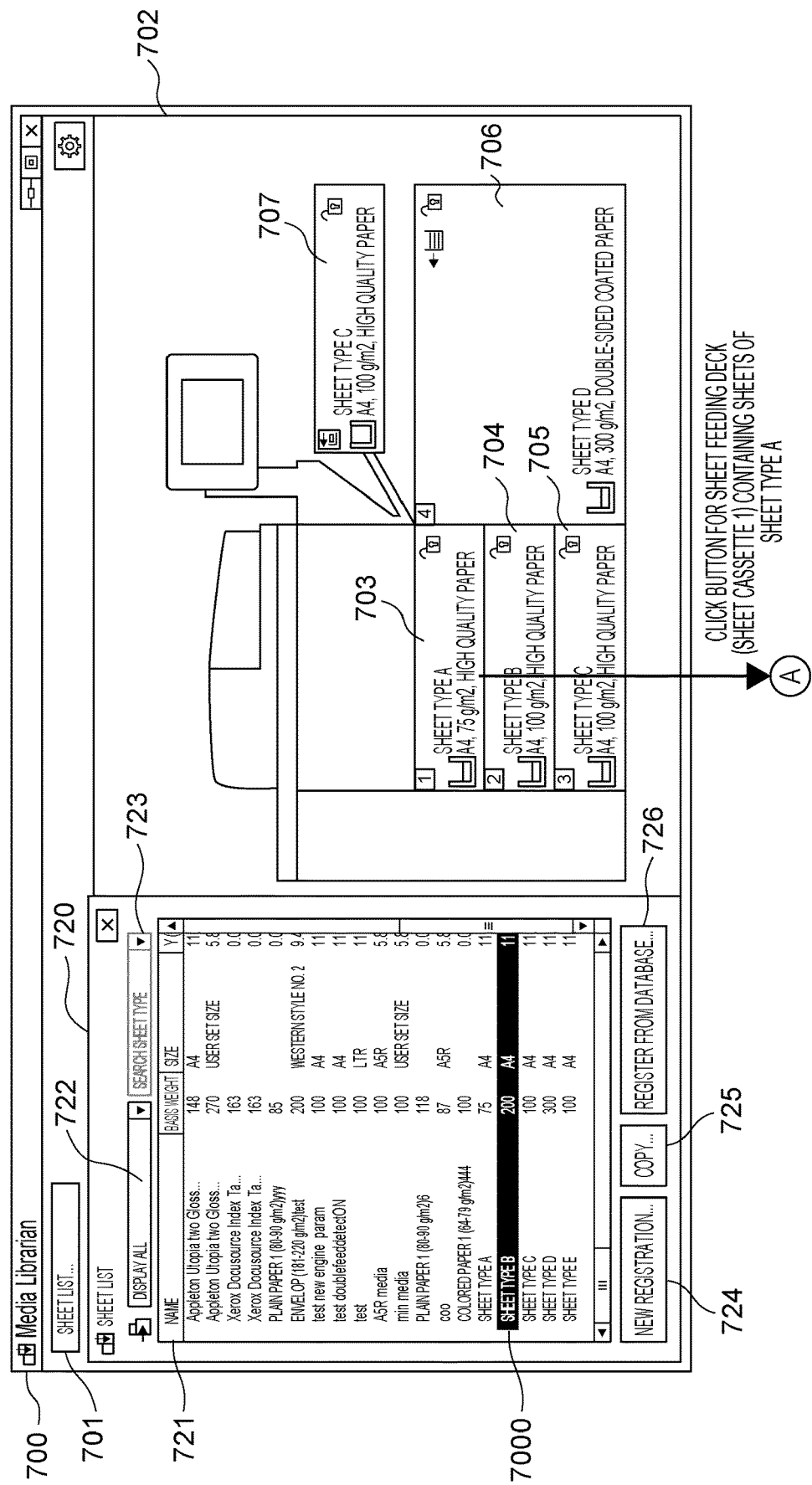
FIGS. 7A to 7C are diagrams illustrating an example of a window transition relating to the processing example according to the first embodiment.
Figure 7B:
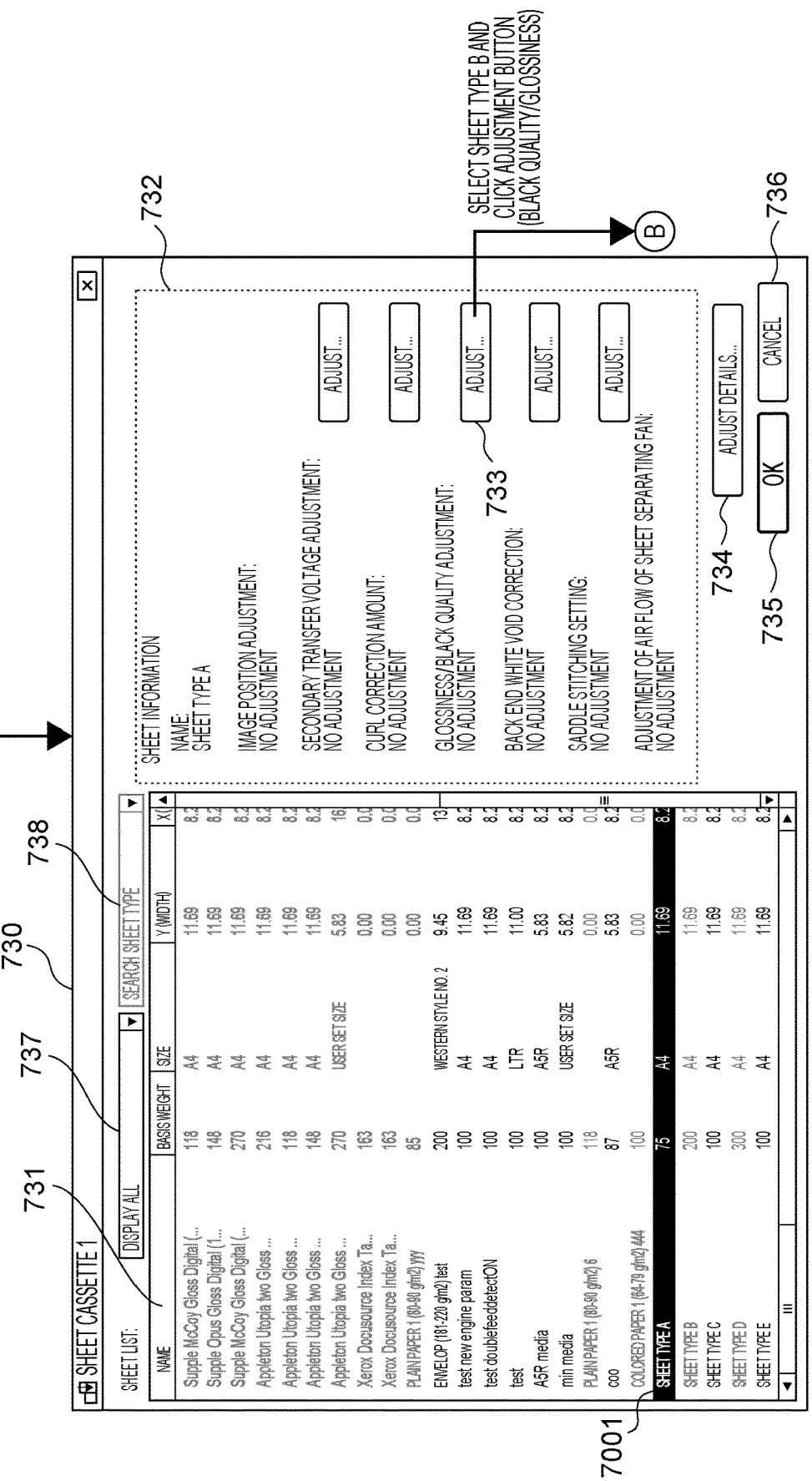
Figure 7C:
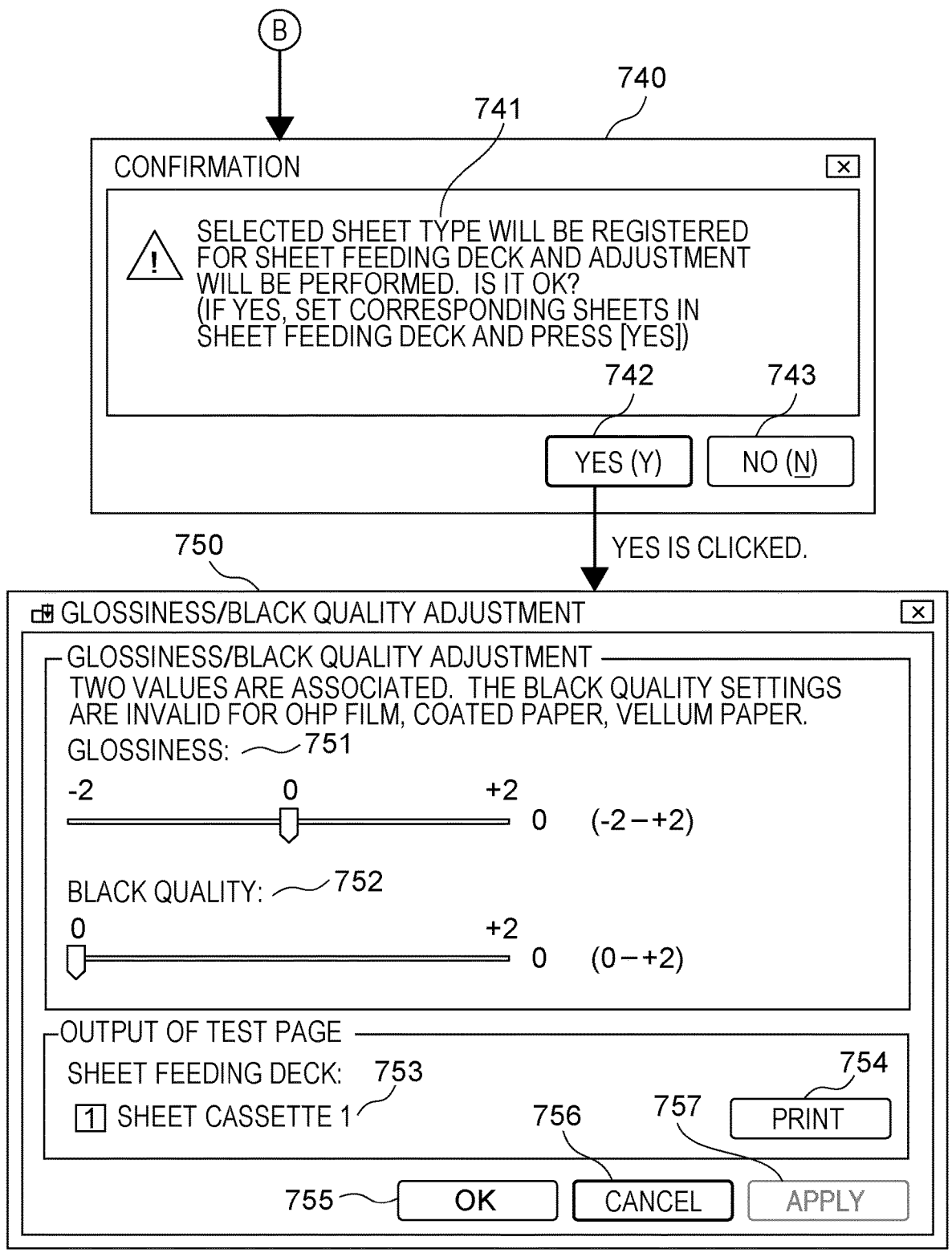

FIGS. 7A to 7C illustrate a window transition example by the sheet management system 100. The sheet management system 100 runs on the print control apparatus 102. FIG. 7A illustrates a top window 700 displaying information regarding sheet feeding decks in the image forming apparatus 103. The top window 700 is displayed in response to an activation instruction from a user. Image data are rendered in the RAM 302 based on an instruction from the CPU 301 in response to the instruction input by a user by using a mouse or a touch panel. The image data rendered in the RAM 302 are output to the display device 111 as a video signal. As a result, display processing of the image data is performed.

The top window 700 provided by the sheet management system 100 and can display sheet feeding deck information on the image forming apparatus 103 (see the state of the window 700 in FIG. 7A). The top window 700 displays connection states of hardware options of the image forming apparatus 103 that are connected to the print control apparatus 102. The sheet management system 100 obtains the hardware option information on the image forming apparatus 103 over the network, for example, in response to the activation instruction as described above and displays a proper image based on the option information. Referring to FIG. 7A according to this embodiment, five sheet feeders (including one manual feed tray) are connected to a discharging device. The window 700 displays sheet feeding deck buttons 703 to 707. Based on the information on the sheet feeding decks in the image forming apparatus 103, which is obtained upon activation of the sheet management system 100, the sheet feeding deck buttons are generated and are arranged. Each of the sheet feeding deck buttons has an area that displays information such as the name of the sheet type of sheets placed in the sheet feeding deck and the remaining number of sheets, for example. When the controller 300 receives a sheet feeding deck state change event from the image forming apparatus 103 upon occurrence of a state change of a sheet feeding deck in the image forming apparatus 103, the controller 300 obtains the sheet feeding deck information again. The controller 300 renders again image data of the display area of the sheet feeding deck button again based on the obtained sheet feeding deck information.

A sheet list button 701 is a button for issuing an instruction to display a sheet list window. According to this embodiment, when the button 701 is pressed, the controller 300 displays a sheet list window 720 in FIG. 7A. In this case, the sheet list window 720 is displayed on the top of the other windows.

Figure 4:
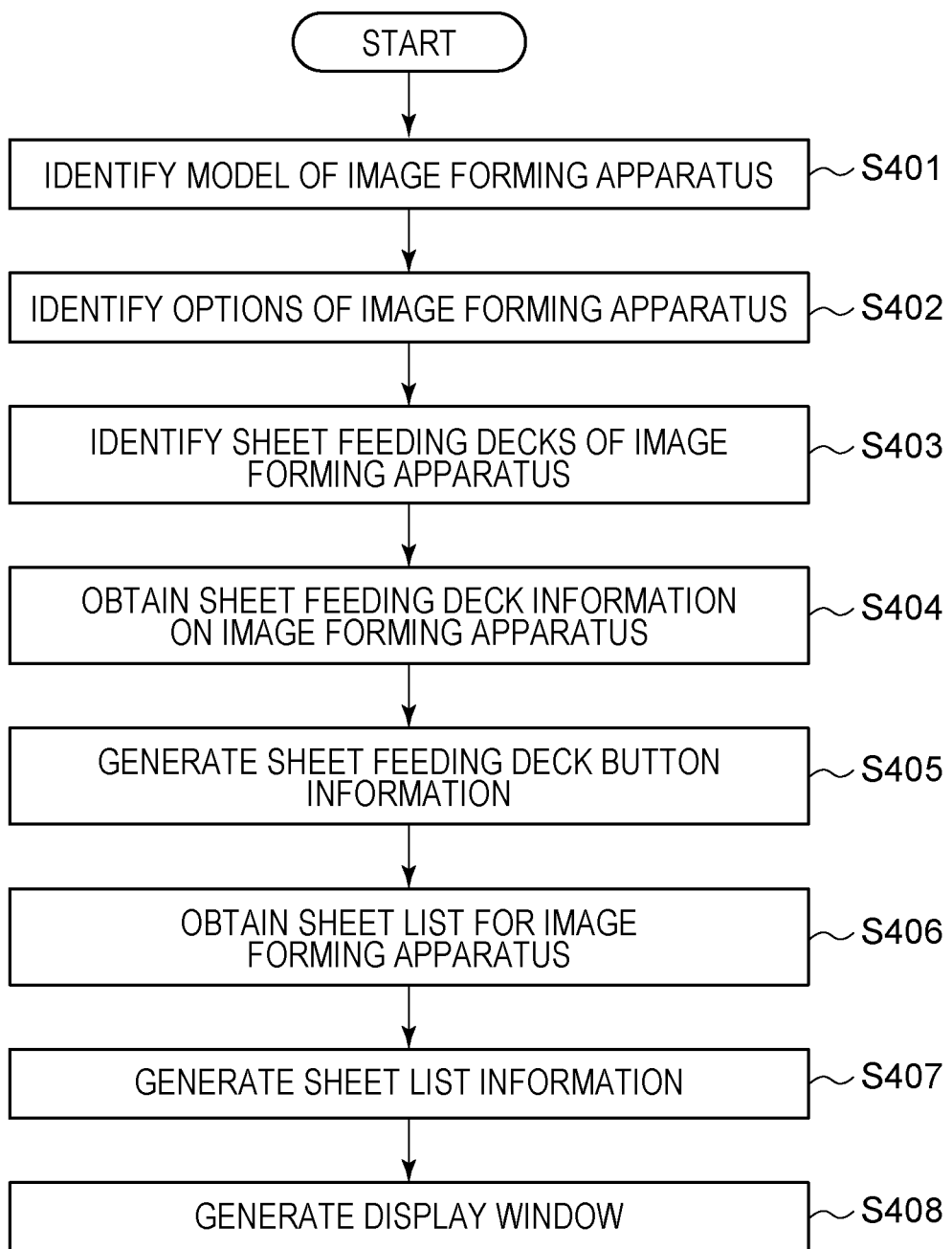
FIG. 4 is a diagram illustrating an example of a flowchart to be executed by a sheet management application.
Figure 5:
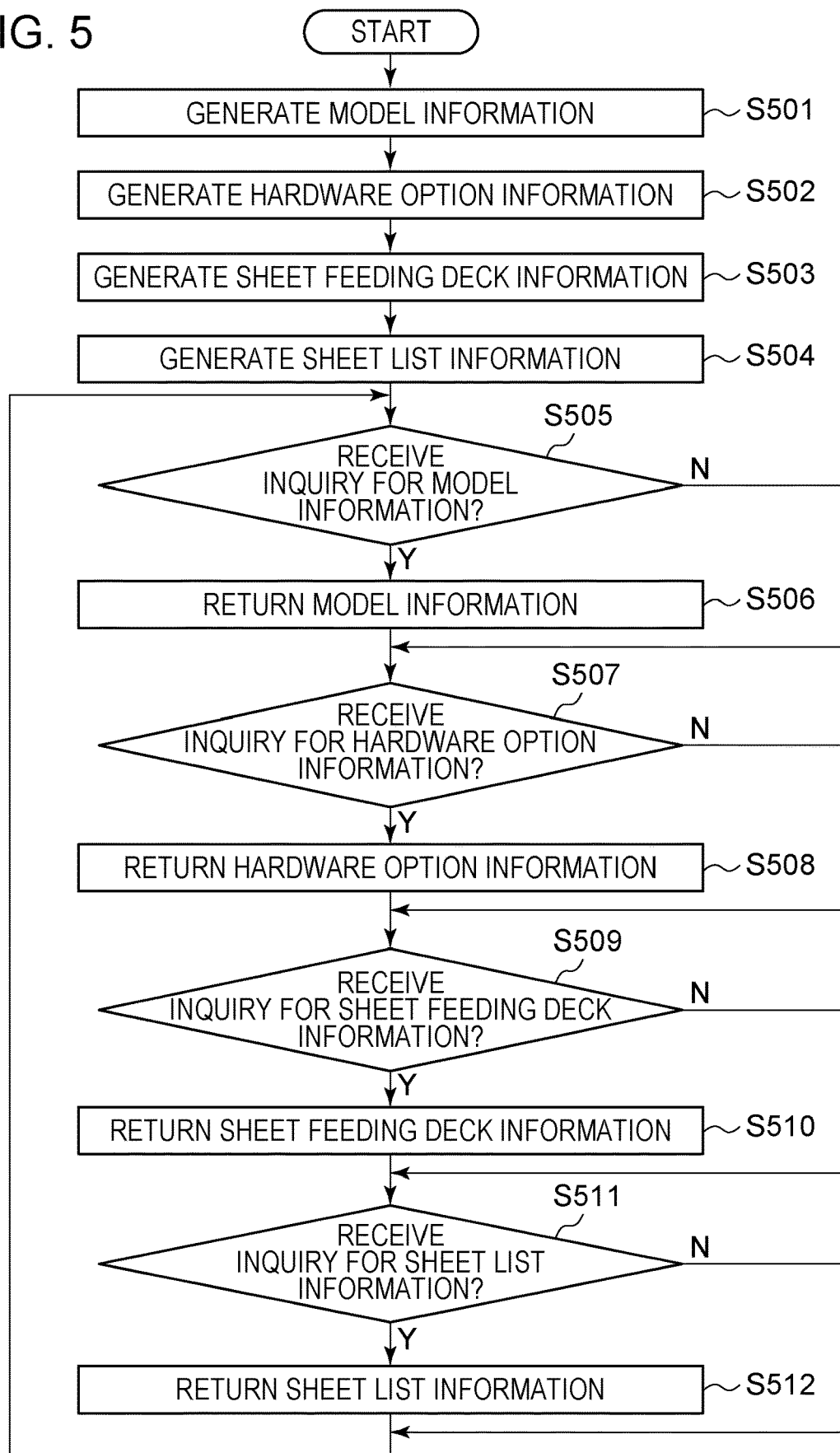
FIG. 5 is a diagram illustrating an example of a flowchart upon start of an image forming apparatus.

A setting button 702 is a button for instructing to display a window for changing system settings for the sheet management system 100. The controller 300 displays the current system settings based on the system settings saved in the external storage device 309. FIG. 4 is a flowchart to be performed by the print control apparatus 102 for generating the top window 700 upon activation of the sheet management system 100. FIG. 5 is a flowchart for generating information to be synchronized with the print control apparatus 102 through communication when the image forming apparatus 103 is activated.

Figure 11A:
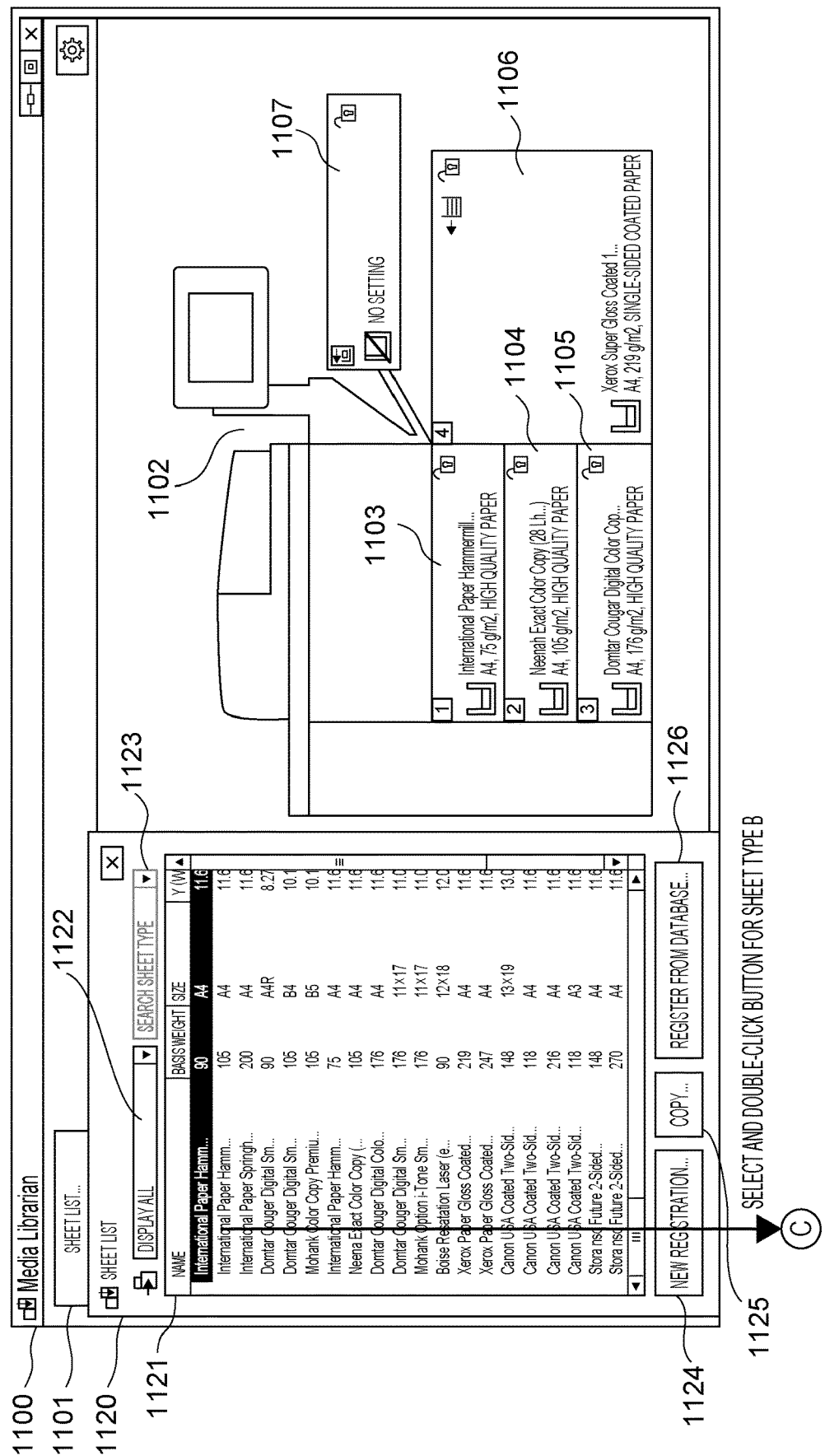
Figure 14A:
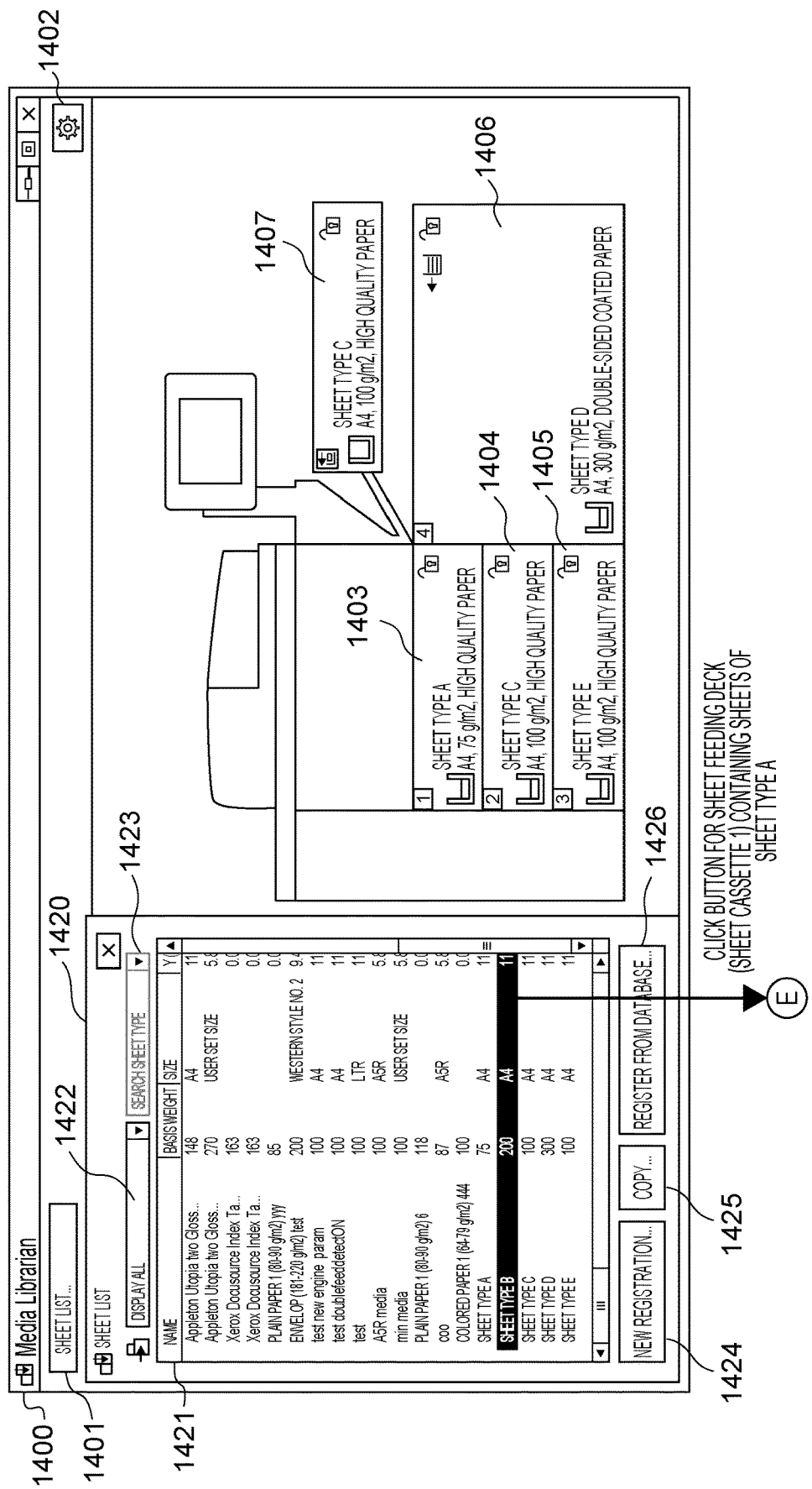

A top window 1100 in FIG. 11A and a top window 1400 in FIG. 14A have the same configuration as that of the top window 700. Therefore, any repetitive descriptions will be omitted.

A program of the print control apparatus 102 according to the flowchart in FIG. 4 is stored in the external storage device 309 in FIG. 3, is read out to the RAM 302, and is executed by the CPU 301. The image forming apparatus 103 is activated based on the flowchart in FIG. 5 (S501 to S504). After that, when the sheet management system 100 is activated, the processing in FIG. 4 is executed. In S401, the controller 300 identifies the model of the image forming apparatus 103 that is a target of the sheet management. The controller 300 communicates with the image forming apparatus 103. The image forming apparatus 103 responds to an inquiry for model information in S505.

The print control apparatus 102 obtains model information returned from the image forming apparatus 103 in S506. Based on the model identification information held by the sheet management system 100 in advance, the print control apparatus 102 identifies the model of the image forming apparatus 103 in S401. The processing then moves to S402.

In S402, the controller 300 identifies hardware options connected to the image forming apparatus 103 and generates the top window 700. In this case, the model identification information is used in order to identify information regarding sheet feeding decks returned from the image forming apparatus 103 or to absorb differences between specifications of models as a result (S508) of the inquiry from the print control apparatus 102 to the image forming apparatus 103 in S507. The print control apparatus 102 obtains the hardware option information by communicating with the image forming apparatus 103. The processing then moves to S403.

The processing in S402, S403, and S404 is performed based on information returned from the image forming apparatus 103 to the print control apparatus 102 in S508, S510, and S512 in FIG. 5. First in S403, the controller 300 identifies sheet feeding decks connected to the image forming apparatus 103 that is a target of the sheet management. The controller 300 then identifies the number of the connected sheet feeding decks and sheet feeding deck information. For example, the sheet feeding deck information to be obtained here is a sheet feeding deck name, a sheet feeding deck ID, and the remaining number of sheets in the sheet feeding deck. Once the sheet feeding decks are identified in S403, the controller 300 executes the sheet feeding deck management module 354 to write the obtained sheet feeding deck information to the sheet feeding deck setting management table 820. The processing moves to S404.

In S404, the controller 300 obtains sheet information set for each of the sheet feeding decks by communicating with the image forming apparatus 103. After the sheet information (sheet type ID) of each of the sheet feeding decks is obtained in S404, the controller 300 executes the sheet feeding deck management module 354 to write the obtained sheet type IDs to areas corresponding with the target sheet feeding deck IDs in the sheet feeding deck setting management table 820. The processing then moves to S405.

In S405, the controller 300 generates information on the sheet feeding deck buttons 703 to 707 to be displayed on the top window 700. After the information on the sheet feeding deck buttons are generated in S405, the processing moves to S406.

In S406, the controller 300 obtains sheet list information by communicating with the image forming apparatus 103. Sheet information includes, for example, a sheet name, parameters for printing (a sheet size to be displayed in basic setting items 1131 in FIG. 11B and setting values for a glossiness/black quality adjustment to be displayed in an adjustment item list 1132 in FIG. 11B), a favorite ID, a usage history, and a settable sheet feeding deck ID. After the sheet list information is obtained in S406, the controller 300 executes the sheet management module 353 to write the obtained sheet list information to the sheet settings management table 810. The processing moves to S407. In S407, the controller 300 generates sheet list information to be displayed in a sheet list display area 721 on the sheet list window 720. For the settable sheet feeding deck IDs, the controller 300 in the print control apparatus 102 may control the sheet management module 353 to determine whether the obtained sheet information is settable for the sheet feeding decks in accordance with the connected image forming apparatus. Alternatively, the controller 300 may control the sheet management module 353 to transmit an inquiry about whether the obtained sheet information is settable for the sheet feeding decks to the image forming apparatus 103 and sets the settable sheet feeding deck IDs returned from the image forming apparatus 103. A usage history that is information regarding the number of times that sheet information is allocated to a sheet feeding deck. When sheet information is generated, the usage history is set to zero. The usage history increments each time the sheet information is allocated to a sheet feeding deck.

After the controller 300 generates the sheet list information in S407, the processing moves to S408.

In S408, the controller 300 generates the top window 700 by using the model hardware option information on the image forming apparatus 103, which is obtained in S401 and S402, and the sheet feeding deck information generated in S405. The controller 300 generates the sheet list window 720 by using the sheet list information generated in S407. In a case where the display device 111 has a low resolution, it means the window display area is narrow. Therefore, the sheet list window 720 may be displayed over the top window 700. In a case where the sheet management system 100 is rebooted after closing the sheet list window 720, the top window 700 may be displayed upon next activation of the sheet management system 100. In this case, after the activation, an operator presses the sheet list button 701 on the top window to display the sheet list window 720 based on the information obtained in step S405 and S407.

The sheet list window 720 in FIG. 7A will be described. Image data of the sheet list window 720 are rendered in the RAM 302 in accordance with a corresponding instruction from the CPU 301, and the image data rendered in the RAM 302 are output to the display device 111 as a video signal so that the sheet list window 720 is displayed. The sheet list window 720 displays the sheet list display area 721, a pull-down menu 722 by which a method for displaying a sheet list is selected, a search input area 723 for sheet information, and buttons for adding sheet information to the sheet list (hereinafter, called sheet addition buttons). As the sheet addition buttons, a new registration button 724 for registering new sheet information with the sheet list, a copy button 725 for copying existing sheet information in the sheet list, and a register from database button 726 for generating sheet information from a sheet database are displayed.

The sheet list display area 721 will be described. The sheet list display area 721 corresponds to a table displaying a sheet list. The sheet list display area 721 has sheet information (such as name, basis weight, and size) at its column and sheet types at its row. In order to display information other than attribute information of displayed sheets, a slider bar may be operated. In order to display a sheet type other than the displayed sheet types, a slider bar may be operated. A sheet type in selection is highlighted so that a user can recognize that it is currently selected. When a sheet type corresponding to one of the rows is selected from the sheet list in the sheet list display area 721 in accordance with a user instruction, sheet information (7000) in selection is identifiably displayed in the sheet list display area 721.

The pull-down menu 722 for selecting a method for displaying the sheet list will be described. The pull-down menu 722 displays ways for displaying the sheet list display area 721. According to this embodiment, as an example, the display ways "DISPLAY ALL", "CLIENT A", "CLIENT B", "CLIENT C" and "HISTORY" are provided. When the window is displayed, "DISPLAY ALL" is selected.

"CLIENT A". "CLIENT B". "CLIENT C" are options for filtering a display content in the sheet list display area 721 for each favorite ID of sheet information. In other words, a client attribute may be given to sheet information, and sheet information of a designated client may be filtered based on the attribute for display.

The search input area 723 will be described. The search input area 723 is an area usable by an operator for inputting a key word for retrieving a desired or predetermined sheet type from the sheet types in the sheet list display area 721.

Because a sheet list window 1120 in FIG. 11A and a sheet list window 1420 in FIG. 14A include the same components as those of the sheet list window 720, any repetitive descriptions will be omitted.

The program in the image forming apparatus 103 according to the flowchart in FIG. 5 is stored in the external storage device 210 in FIG. 2, is read out to the RAM 202, and is executed by the CPU 201. After the image forming apparatus 103 is activated, the processing moves to S501. In S501, the controller 200 obtains model information of the image forming apparatus 103 from the external storage device 210 and generates returnable data of the model information.

After the data of the model information is generated in S501, the processing moves to S502.

In S502, the controller 200 obtains information on hardware options connected to the image forming apparatus 103 from the print engine 213 through the print interface 207 and generates returnable data from the information to the RAM 202. After the data of the hardware option information is generated in S502, the processing moves to S503.

In S503, the controller 200 obtains sheet feeding deck information of the image forming apparatus 103 from the hardware option information in the RAM 202 and generates returnable data thereof. After the data of the sheet feeding deck information is generated in S503, the processing moves to S504.

In S504, the controller 200 obtains sheet list information on the image forming apparatus 103 from the external storage device 210 and generates returnable data thereof. After the data of the sheet list information is generated in S504, the processing moves to S505.

In S505, the controller 200 determines whether an inquiry about the model information has been received from the print control apparatus 102. If the inquiry about the model information has been received, the processing moves to S506 where the model information generated in S501 is returned. Then, the processing moves to S507. If no inquiry about the model information has been received in S505, the processing also moves to S507.

In S507, the controller 200 determines whether an inquiry about the hardware option information has been received from the print control apparatus 102. If the inquiry about the hardware option information has been received, the processing moves to S508 where the hardware option information generated in S502 is returned. The processing then moves to S509. If no inquiry about the hardware option information has been received in S507, the processing also moves to S509.

In S509, the controller 200 determines whether an inquiry about the sheet feeding deck information has been received from the print control apparatus 102. If the inquiry about the sheet feeding deck information has been received, the processing moves to S510 where the sheet feeding deck information generated in S503 is returned. The processing then moves to S511. If no inquiry about the sheet feeding deck information has been received in S509, the processing also moves to S511.

In S511, the controller 200 determines whether an inquiry about the sheet list information has been received from the print control apparatus 102. If the inquiry about the sheet list information has been received, the processing moves to S512 where the sheet list information generated in S504 is returned. The processing then moves to S505. If no inquiry about the sheet list information has been received in S511, the processing also moves to S505.

Referring back to FIG. 7A to 7C, when the button 703 for a sheet cassette 1 is pressed by using the pointing device 113, for example, a sheet setting window 730 for the sheet cassette 1 in FIG. 7B is displayed. Because the buttons 704 to 707 are configured in the same manner as the button 703, any repetitive descriptions will be omitted. The sheet feeding decks include all of sheet feeders such as an inserter and a manual feed tray although they are not described in detail in embodiments. The use of the pointing device 113, for example, is not described in descriptions of operations performed on an application such as pressing a button, but such an input device is used for the operations.

The sheet setting window 730 for the sheet cassette 1 in FIG. 7B will be described. Image data of the sheet setting window 730 are rendered in the RAM 302 in accordance with a corresponding instruction from the CPU 301, and the image data rendered in the RAM 302 are output to the display device 111 as a video signal so that the sheet setting window 730 is displayed. The sheet setting window 730 displays a sheet list display area 731, a sheet information display area 732, a button 733 for displaying an adjustment window for an adjustment item, a button 734 for displaying a setting window for sheet information other than those displayed in the current sheet setting window 730, an OK button 735, and a cancel button 736. The sheet setting window 730 further displays a pull-down menu 737 by which a method for displaying a sheet list is selected and a search input area 738 for sheet information.

For example, when the sheet feeding deck button 703 on the top window 700 in FIG. 7A is pressed to open the window 730, the information on the sheet type currently allocated to the sheet cassette 1 has a selected state 7001 and is displayed in the sheet information display area 732. In other words, when the sheet setting window 730 is displayed, the sheet type set in the sheet feeding deck selected in the top window 700 has a selected state in the sheet list display area 731. If another sheet type is selected from the sheet list in the sheet list display area 731 here, the information on the selected sheet is displayed in the sheet information display area 732. When another sheet type is selected in the sheet list display area 731, the sheet type is highlighted. After another sheet type is selected in the sheet list display area 731, the OK button 735 is pressed. Then, the controller 300 transmits settings for the other selected sheet type to the image forming apparatus 103 for defining the settings. When another sheet is selected in the sheet list display area 731 and the cancel button 736 is pressed, the controller 300 closes the sheet setting window 730 without performing the sheet setting operation on the image forming apparatus 103.

The sheet information display area 732 displays setting information regarding the currently selected sheet type. Items displayed in the sheet information display area 732 will be described. For improvement or refinement of convenience of an operator, sheet information that is frequently used by the operator is displayed as examples according to this embodiment. More specifically, the sheet information display area 732 displays the name of the selected sheet type and adjustment items (image position adjustment, secondary transfer voltage adjustment, curl correction amount, glossiness/black quality adjustment, back end white void correction, saddle stitching setting, adjustment of air flow of sheet separating fan). The items will be described in the description of a sheet setting window 1130 in FIG. 11B. The sheet information display area 732 displays the name of the currently selected sheet type and whether the adjustment values are changed from the initial values in the image forming apparatus 103. If an adjustment value is not changed, "NO ADJUSTMENT" is displayed. If an adjustment value is changed, "ADJUSTED" is displayed. A button 733 is displayed for an item adjustable from the print control apparatus 102 so that a corresponding adjustment window can be displayed.

The button 734 is a button to be pressed for checking and changing settings in information that is not displayed in the sheet information display area 732. For example, the sheet setting window 1130 in FIG. 11B may be displayed.

Because the pull-down menu 737 for selecting a method for displaying a sheet list is configured in the same manner as that of the pull-down menu 722, any repetitive description will be omitted.

Because the search input area 738 is configured as that of the search input area 723, any repetitive description will be omitted.

Figure 14B:
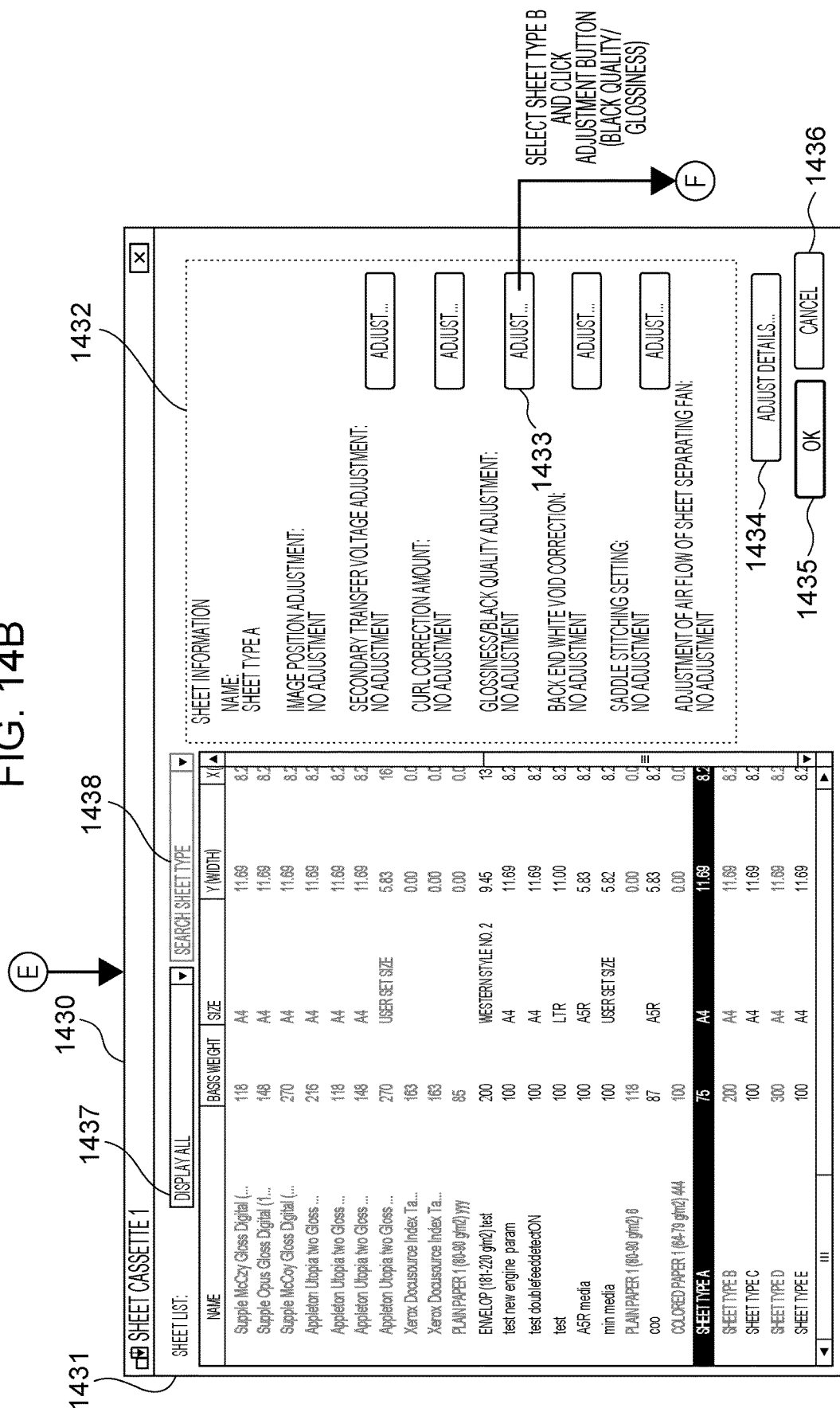

Because a sheet setting window 1430 in FIG. 14B is configured in the same manner as that of the sheet setting window 730, any repetitive description will be omitted.

A glossiness/black quality adjustment window 750 in FIG. 7C will be described. Image data of the adjustment window 750 are rendered in the RAM 302 in accordance with a corresponding instruction from the CPU 301, and the image data rendered in the RAM 302 are output to the display device 111 as a video signal so that the adjustment window 750 can be displayed. The adjustment window 750 displays a glossiness level 751 that affects glossiness and a black quality level 752 that affects black quality, and a sheet feeder 753 indicating a sheet feeder that feeds a sheet for execution of confirmation printing. Furthermore, a button 754 for executing confirmation printing, an OK button 755, a cancel button 756, and a button 757 for applying an adjustment result are displayed. The glossiness/black quality adjustment is an item for adjusting glossiness of an output image by adjusting the temperature of a fixing unit when plain paper or coated paper is used, for example. The glossiness level 751 and the black quality level 752 are adjusted by using corresponding slider bars here. However, the adjustments may be implemented by a text box for entering a numerical value and count-up and -down buttons. The apply button 757 may be gray-out so that it cannot be clicked until the glossiness level 751 or the black quality level 752 is changed.

When the button 754 is clicked, the controller 300 writes information on the current sheet type to the sheet settings management table 810. The controller 300 then transmits to the image forming apparatus 103 a sheet setting instruction to register the information in the sheet settings management table 810 corresponding to the currently selected sheet type with a sheet feeding deck. The controller 300 transmits an execution instruction to execute confirmation printing to the image forming apparatus 103.

When the OK button 755 is clicked, the controller 300 writes information on the current sheet type to the sheet settings management table 810. The controller 300 transmits to the image forming apparatus 103 a sheet setting instruction to register the information in the sheet settings management table 810 corresponding to the currently selected sheet type with the sheet feeding deck.

When the cancel button 756 is clicked, the controller 300 writes the sheet information set when the adjustment window 750 is started to display to the sheet settings management table 810. The controller 300 transmits to the image forming apparatus 103 a sheet setting instruction to register the information in the sheet settings management table 810 corresponding to the currently selected sheet type with the sheet feeding deck.

Figure 11C:
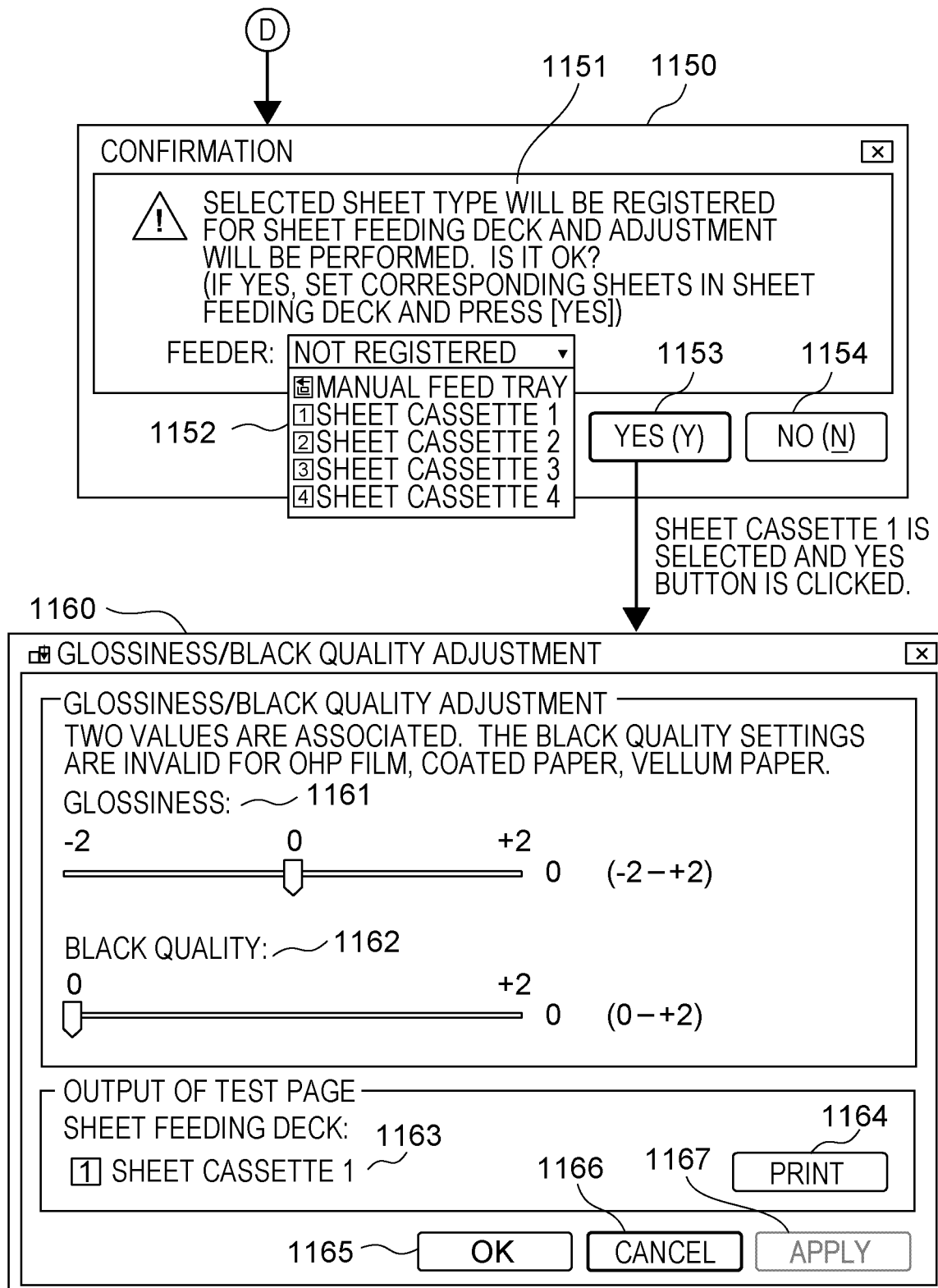
Figure 14C:
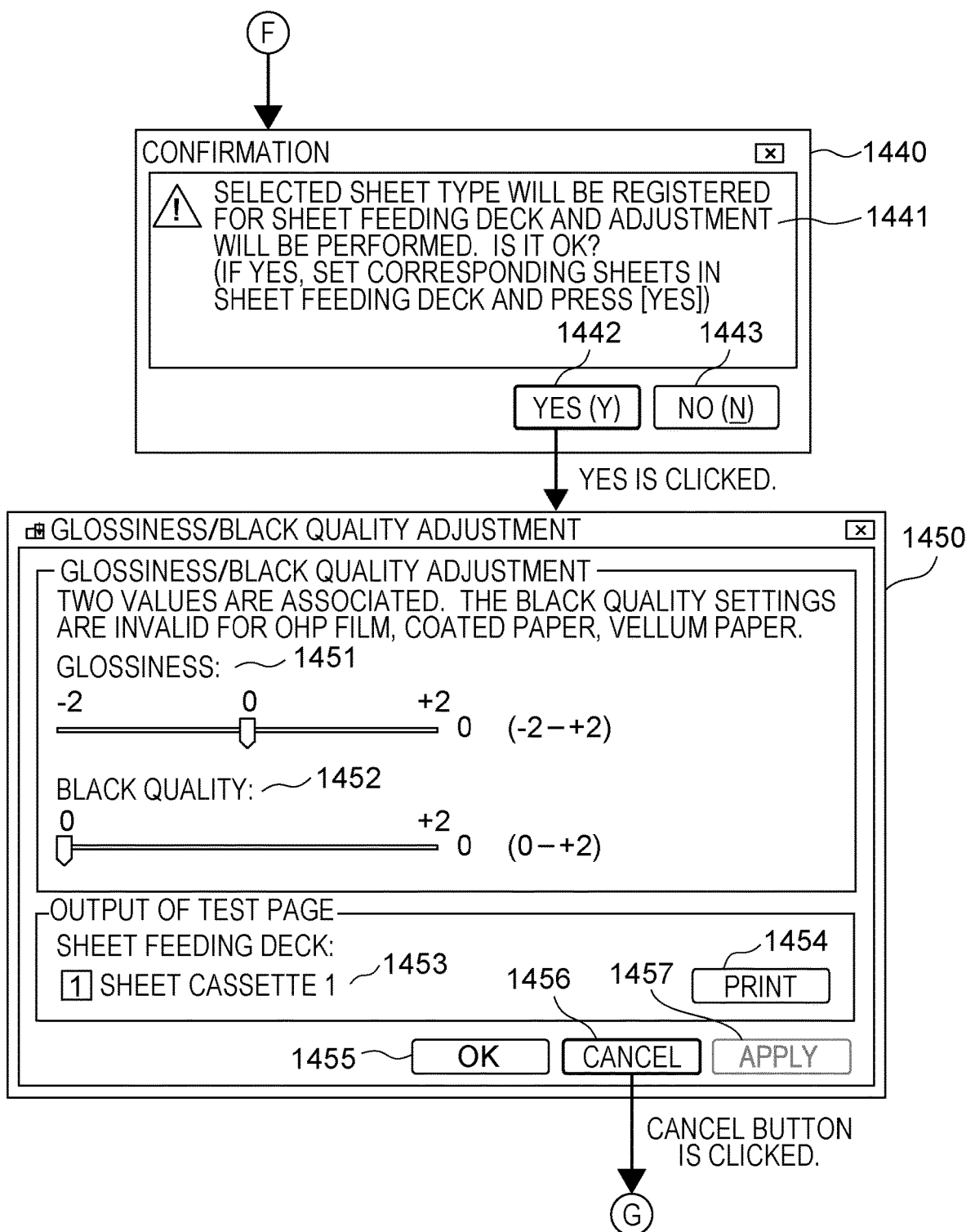

Because an adjustment window 1160 in FIG. 11C and an adjustment window 1450 in FIG. 14C are configured in the same manner as that of the adjustment window 750, any repetitive descriptions will be omitted.

The sheet setting window 1130 in FIG. 11B will be described. The sheet setting window 1130 is a window for newly registering sheet information and for editing registered sheet information. The sheet setting window 1130 includes a sheet information input area 1131, a sheet information adjustment item list 1132, a pull-down menu 1133 for changing an adjustment item list display group, an OK button 1134, and a cancel button 1135. The sheet information input area 1131 displays minimum setting items for handling a sheet in sheet information. According to this embodiment, the displayed setting items include a name, a basis weight, a color, a surface property, a size, a feature, a double-sided/second side, favorites, for example. In a text area 1136, a name of a sheet type can be input. In order to change the name of a sheet type, text can be input in the text area 1136 by using the keyboard 112, for example. For example, the text area 1136 may be blank for new registration and a name of the currently selected sheet type may be displayed for editing. In order to reflect the changed information to the sheet information, the OK button 1134 in the sheet setting window 1130 is pressed. When the OK button 1134 is pressed, the sheet information in the print control apparatus 102 and the image forming apparatus 103 can be changed. When the cancel button 1135 is pressed, the sheet settings can be cancelled. In a text area 1137, a basis weight can be input. Because the operations to be performed on the text area 1137 are the same as the name text area 1136, any repetitive descriptions hereinafter will be omitted. A pull-down menu 1138 displays color information of the sheet type, which is selectable from a list. A pull-down menu 1139 displays surface property information, which is selectable from a list. A pull-down menu 1140 displays size information of a sheet, which is selectable from a list. In a text area 1141, lengths in the main scanning and sub scanning directions of a sheet size can be input. The lengths can be input when a user defined size is selected in the pull-down menu 1140. Because A4 is set as the sheet size in the sheet setting window 1130, the text area 1141 is gray-out for disabling inputting. In this case, buttons for selecting millimeter and inch may be provided for changing the input unit between millimeter and inch. A pull-down menu 1142 displays feature information, which is selected from a list. A pull-down menu 1143 displays a position of a flap of an envelope, which is selected from a list. When "envelope" is selected in the pull-down menu 1142, the pull-down menu 1143 is allowed. A radio button 1144 displays double-sided/second side information and is used for changing between "not set" and "set". The double-sided/second side information is a setting for changing the voltage of transfer for fixing on a back side of a sheet having undergone fixing on its front side, which is inserted to the sheet feeding deck.

A favorite setting 1145 is a menu displaying a favorite list saved in the external storage device 309. In the favorite setting 1145, which of the listed favorites the selected sheet type belongs to can be set. Here, the favorite setting 1145 with check boxes is displayed. When one of the check boxes is checked, the selected sheet type belongs to the checked target favorite. For example, because three favorites (client A, client B and client C) in the favorite setting 1145 are not checked, the sheet type does not belong to any of them. In order to reflect the changed information to the sheet information, the OK button 1134 in the sheet setting window 1130 is pressed. When the OK button 1134 is pressed, the sheet information in the print control apparatus 102 and the image forming apparatus 103 can be changed. When receiving an instruction to generate the sheet setting window 1130, the controller 300 controls the setting management module 357 to obtain a favorite setting table. The controller 300 controls the UI control module 352 to display the sheet setting window 1130 based on the obtained favorite information.

A favorite register/edit button 1146 is a button for displaying a favorite management window. In the favorite management window, addition, editing, and deletion of a favorite can be performed.

The adjustment item list 1132 displays a list of a name, adjustment/no adjustment and a display group for each of items adjustable by changing the corresponding setting value in the sheet information. For adjustment of an adjustment item, an adjustment item is selected in the adjustment item list 1132. Then, the sheet setting window 1130 may display a detail value of the adjustment value and an adjustment button. In this case, when the adjustment button is pressed, a target adjustment window may be displayed. Outlines of adjustment items displayed in the adjustment item list 1132 will be described. The glossiness/black quality adjustment is an item for adjusting the glossiness of an output image by adjusting the temperature of the fixing unit in a case where plain paper or a coated paper is used, for example. It is defined as a display group "image quality". The secondary transfer voltage adjustment is an adjustment item for changing voltage for transferring a toner image to a sheet. It is defined as a display group "image quality". The back end white void correction is an adjustment item for changing transfer voltage in a case where white void of toner occurs or where color gets light at a back end of a sheet in a conveying direction. It is defined as a display group "image quality". The adjustment of secondary transfer discharging bias is an adjustment item for change voltage value (discharging bias) for removing static electricity remaining in an intermediate transfer belt. It is defined as a display group "image quality". The ITB image removal adjustment is an adjustment item for changing the degree of image removal on the intermediate transfer belt. It is defined as a display group "image quality". The toner amount adjustment mode is an adjustment item for changing the total amount of toner. It is defined as a display group "image quality". The primary transfer voltage adjustment is an adjustment item for changing voltage for transferring a toner image from the intermediate transfer belt to a sheet. It is defined as a display group "image quality". The registration loop amount adjustment is an adjustment item for changing the amount of bending of a sheet formed when an image position is adjusted. It is defined as a display group "image quality". The registration speed adjustment is an adjustment item for changing the speed for adjusting an image position. It is defined as a display group "image quality". The adjustment for the image rubbing correction is an adjustment item for changing the transfer speed when a fuzzy image or uneven density occurs because a sheet is transformed due to an uneven water content and a sheet conveying defect is caused. It is defined as a display group "image quality". The fixing pressure adjustment is an adjustment item for changing the fixing pressure. It is defined as a display group "image quality". The fixing speed adjustment is an adjustment item for changing the fixing speed. It is defined as a display group "image quality".

The image position adjustment is an adjustment item for changing a printing position on front side and back side sheets. It is defined as a display group "image position". The leading edge/back end margin adjustment is an adjustment item for changing lengths of margins on the leading edge side and the back end side in the conveying direction for printing. It is defined as a display group "image position". The automatic adjustment of horizontal registration is an adjustment item for preventing an image from being misaligned vertically (horizontally) in the conveying direction. It is defined as a display group "image position". The adjustment of air flow of sheet separating fan is an adjustment item for changing the airflow of a fan for separating sheets. It is defined as a display group "sheet conveyance". The adjustment of air flow of pre-fixing conveying fan is an adjustment item for changing the air flow of a pre-fixing conveying fan. It is defined as a display group "sheet conveyance".

A pull-down menu 1133 is a pull-down menu for selecting a filter for displaying the adjustment items in the adjustment item list 1132 for each group. For example, when "image quality" is selected in the pull-down menu 1133, the controller 300 controls the UI control module 352 to display adjustment items having "image quality" as their display groups in the adjustment item list 1132.

Embodiments will be described as a sheet management application running on the print control apparatus 102. However, embodiments are not limited to the sheet management application. The same mechanism may be implemented in the client computer 101 or the image forming apparatus 103.

Embodiment 1

Processing to be performed by the print control apparatus 102 and the image forming apparatus 103 according to Embodiment 1 will be described with reference to FIGS. 6A and 6B. A program, which will be described below, in the print control apparatus 102 is stored in the external storage device 309 in FIG. 3A, is read to the RAM 302, and is executed by the CPU 301.

According to this embodiment, an example in which an operator selects a sheet type (sheet type B) that is not set for a sheet feeding deck (sheet cassette 1), and operations from a sheet setting operation to confirmation printing after adjustments are performed will be described with reference to the flowcharts in FIGS. 6A and 6B and FIGS. 9A and 9B.

In step S601, an operator presses a sheet feeding deck button 703 (sheet cassette 1) on the top window 700 provided by the sheet management system 100. The controller 300 detects the press.

In step S602, the controller 300 in the print control apparatus 102 controls the UI control module 352 to obtain the sheet feeding deck setting management table 820 from the sheet feeding deck management module 354. The controller 300 controls the UI control module 352 to generate the sheet setting window 730 corresponding to the sheet cassette 1 based on the obtained sheet feeding deck list. Here, a sheet type ID 1 or sheet type A is designated for the sheet cassette 1. Thus, the sheet type A is in a selected state on the sheet setting window 730. The sheet information display area 732 displays information on the sheet type A based on the sheet settings management table 810.

In step S603, the controller 300 controls the UI control module 352 to display the sheet setting window 730 on the display device 111.

In step S604, an operator clicks and selects a sheet type B in the sheet list display area 731. The controller 300 detects the selection.

In step S605, when the controller 300 detects the change of the selection target in the sheet list display area 731, the controller 300 controls the UI control module 352 to obtain information on the selected sheet type from sheet information in the sheet settings management table 810 and update the information in the sheet information display area 732.

For example, when the sheet type B is selected in the sheet list display area 731, the controller 300 refers to the sheet type ID in the sheet information in the sheet settings management table 810 and determines whether the sheet type B (sheet type ID=2) is included in the sheet information or not. The controller 300 controls the UI control module 352 to display information on the matching sheet in the sheet information display area 732.

In step S606, the controller 300 controls the UI control module 352 to display the sheet setting window 730 for the sheet cassette 1 which displays the information on the sheet type B in step S605.

In step S607, the operator clicks an adjustment button 733 for adjusting glossiness and black quality adjustment items. The controller 300 detects the click.

In step S608, the controller 300 determines whether there is a match between the sheet type of sheets set for the sheet feeding deck (sheet cassette 1) and the sheet type selected in step S604. For example, the controller 300 refers to the sheet type (sheet type ID=1) of sheets in the sheet cassette 1 in the sheet feeding deck setting management table 820 and compares it with the selected sheet type B (sheet type ID=2). Because there is not a match between the sheet type IDs, a mismatch is detected. The processing moves to step S609.

In step S609, the controller 300 controls the UI control module 352 to generate a confirmation window 740 in FIG. 7C for the display device 111.

Next, the confirmation window 740 in FIG. 7C will be described. The confirmation window 740 is a window for prompting confirmation on whether the sheet type selected in step S604 may be set for the sheet feeding deck if the selected sheet type is not set for the sheet feeding deck. Image data of the confirmation window 740 are rendered in the RAM 302 in accordance with a corresponding instruction from the CPU 301, and the image data rendered in the RAM 302 are output to and displayed on the display device 111 as a video signal. The confirmation window 740 displays a message display area 741, a "yes" button 742, and "no" button 743.

This embodiment is described by assuming that the confirmation window 740 is to be displayed, but the confirmation window 740 may have a checkbox to set prevention of the opening of the confirmation window from the next time.

Also, the display area 741 may display text such that the sheet type set for the sheet feeding deck and the sheet type to be adjusted from now on can be easily recognized. For example, text "The sheet type A is registered with the sheet feeder. The selected sheet type (sheet type B) will be registered for the sheet feeder, and adjustment is performed thereon. Is it OK? (If yes, place the corresponding sheets in the sheet feeder, and press [yes]." may be displayed in the display area 741.

In step S610, the controller 300 controls the UI control module 352 to display the confirmation window 740 in FIG. 7C on the display device 111.

In step S611, the operator opens the sheet cassette 1 in the image forming apparatus 103 and places a sheet bundle of the sheet type B. The operator closes the sheet cassette 1.

In step S612, the operator clicks the "yes" button 742 to set the currently selected sheet type for the sheet cassette 1 and continue adjustment operations.

In step S613, the controller 300 controls the sheet management module 353 to generate a sheet setting instruction to register the information on the sheet settings management table 810 regarding the currently selected sheet type B with the sheet feeding deck (sheet cassette 1). The controller 300 controls the network control module 355 to transmit the sheet setting instruction to the image forming apparatus 103 via the control cable 108 by controlling the LAN controller 306.

In step S614, if the controller 200 in the image forming apparatus 103 receives the sheet setting instruction by using the LAN controller 206, the received sheet information on the sheet type B is set for the designated sheet feeding deck (sheet cassette 1 here). The controller 300 increments a counter for the usage history of the set sheet type and controls the sheet management module 353 to write the usage history count in the usage history on the sheet settings management table 810 corresponding to the target sheet type ID.

In step S615, the controller 300 controls the UI control module 352 to generate the adjustment window 750 for glossiness/black quality in FIG. 7C for the display device 111.

The flow of the processing from step S601 to S615 will be described with reference to a flowchart in FIG. 9A.

In step S901, the controller 300 detects that the sheet feeding deck button 703 has been clicked on the top window 700. The controller 300 controls the UI control module 352 to display the sheet setting window 730 for the sheet cassette 1 that displays information on the sheet type B.

In step S902, the controller 300 determines whether the adjustment button 733 for glossiness/black quality has been clicked. If the adjustment button 733 has been clicked, the controller 300 moves the processing to step S903. Until the adjustment button 733 is clicked, the controller 300 controls to keep displaying the sheet setting window 730 for waiting for an operation on the window. On the sheet setting window 730, another sheet type may be selected again.

In step S903, the controller 300 displays the confirmation window and performs processing by a confirmation unit configured to control whether the currently selected sheet type is to be set for the sheet feeding deck or not.

The confirmation unit in step S903 will be described in detail with reference to FIG. 9B.

In step S911, the controller 300 determines whether there is a match between the sheet type set for the sheet feeding deck (sheet cassette 1) and the sheet type selected in step S604 in FIG. 6A. If there is not a match between the set sheet type and the selected sheet type, the controller 300 moves the processing to the step S912. If there is a match between the set sheet type and the selected sheet type, the controller 300 ends the processing of the confirmation unit. For example, the controller 300 refers to the sheet type (sheet type ID=1) for the sheet cassette 1 on the sheet feeding deck setting management table 820 and compares it with the currently selected sheet type B (sheet type ID=2). Because there is not a match between the sheet type IDs, a mismatch is detected. The processing then moves to step S912.

In step S912, the controller 300 controls the UI control module 352 to display the confirmation window 740 in FIG. 7C on the display device 111.

In step S913, the controller 300 determines whether the "yes" button 742 or the "no" button 743 has been clicked. If the "yes" button 742 has been clicked, the controller 300 moves the processing to step S914. If the "no" button 743 has been clicked, the controller 300 ends the processing of the confirmation unit. Until the "yes" button 742 or the "no" button 743 is clicked, the controller 300 keeps displaying the confirmation window 740 and controls to wait for an operation on the window. The example in which the message display area 741 displays a message prompting to change sheets is described, and the "yes" button 742 may be gray-out until the sheet change is performed. For example, the "yes" button 742 may be gray-out until an open and close event associated with the sheet cassette 1 is received from the image forming apparatus 103.

In step S914, the controller 300 controls the sheet management module 353 to generate a sheet setting instruction to register the information on the sheet settings management table 810 for the currently selected sheet type B with the sheet feeding deck (sheet cassette 1). The controller 300 controls the network control module 355 to transmit the sheet setting instruction to the image forming apparatus 103 via the control cable 108 by controlling the LAN controller 306. For example, the controller 300 writes the sheet type ID=2 corresponding to the sheet type B to the sheet type ID area corresponding to the sheet cassette 1 (sheet feeding deck ID=1) on the sheet feeding deck setting management table 820.

Up to this point, the confirmation unit in step S903 has been described with reference to FIG. 9B. Referring back to FIG. 9A, the subsequent processing will further be described.

In step S904, the controller 300 controls the UI control module 352 to generate the glossiness/black quality adjustment window 750 in FIG. 7C to be displayed on the display device 111.

Up to this point, the flow of the processing from step S601 to S615 has been described above.

In step S616, the controller 300 controls the UI control module 352 to display the glossiness/black quality adjustment window 750 in FIG. 7C on the display device 111.

In step S617, the operator changes the adjustment value of the glossiness level 751 or the black quality level 752.

In step S618, the controller 300 controls the UI control module 352 to store the changed adjustment value in the RAM 302.

In step S619, the operator clicks the button 754 to execute confirmation printing to check the adjustment result.

In step S620, the controller 300 transmits the sheet setting instruction to the image forming apparatus 103, like step S613.

In step S621, the controller 200 in the image forming apparatus 103 sets the received sheet information on the sheet type B, like step S614.

In step S622, the controller 300 transmits a print instruction for the confirmation printing to the image forming apparatus 103. The print instruction includes the sheet type and sheet feeding deck to be used for the printing that are designated by the controller 300 upon transmission of the print instruction. According to this embodiment, the image forming apparatus 103 internally contains data for the confirmation printing. However, page description language (PDL) data may be transmitted to the print control apparatus 102 as an instruction to execute the print processing. Alternatively, data with a job ticket in a job definition format (JDF), for example, may be transmitted to the image forming apparatus 103.

In step S623, the controller 200 in the image forming apparatus 103 controls to feed a sheet from the designated sheet feeding deck or the sheet feeding deck with which the designated sheet type is registered in accordance with the received print instruction. Here, because the sheet cassette 1 is designated as the sheet feeding deck in the print data, the sheet cassette 1 is used.

In step S624, the controller 200 in the image forming apparatus 103 controls to output and print an image signal as the output information to the print unit (print engine) 213 connected to the controller 200 through the print interface 207.

Up to this point, the flow of a series of operations has been described including selecting a sheet type (sheet type B) not set for the sheet feeding deck (sheet cassette 1), setting the sheet type and executing confirmation printing after adjustments. Thus, the operator may not open a sheet setting window for setting a sheet type but may change the adjustment values and execute confirmation printing after the adjustment on the adjustment window. This improves or refines operator's convenience for performing the sheet setting operations on sheets in a digital multi-function peripheral.

Embodiment 2

According to Embodiment 1, the sheet setting operations and adjustment operations are performed by starting with pressing the sheet feeding deck button 703. Another embodiment may be considered in which the adjustment operations are performed through a sheet list window 1120 in FIG. 11A. For example, on the sheet list window 1120 in FIG. 11A, an operator double-clicks the sheet type B. Then, a glossiness/black quality adjustment window 1160 is displayed through a sheet setting window 1130 to perform the adjustment operations. In this embodiment, for example, in a case where the operator selects a sheet type that is not set for any of the sheet feeding decks and performs operations on the adjustment window 1160, the confirmation printing for the adjustment cannot be performed. Accordingly, the operator sets the sheet type on the sheet setting window 730. The glossiness/black quality adjustment window 1160 is displayed through the sheet setting window 1130, and the operator performs the adjustment operation. This may require time and labor for operations up to the confirmation printing after the adjustment.

According to Embodiment 2, in such a case, a unit is provided that selects a sheet feeding deck for which a sheet type is set on the confirmation window.

According to this embodiment, an example in which an operator selects a sheet type (sheet type B) that is not set for a sheet feeding deck (sheet cassette 1) and performs an adjustment operation without performing a sheet setting operation on the sheet list window 1120 will be described with reference to flowcharts in FIGS. 10A and 10B and FIGS. 12A and 12B.

In step S1001, an operator double-clicks a sheet type B in the sheet list display area 1121 in the sheet list window 1120 of the sheet management system 100.

In step S1002, the controller 300 in the print control apparatus 102 controls the UI control module 352 to obtain the sheet settings management table 810 from the sheet management module 353. The controller 300 controls the UI control module 352 to obtain information on the currently set sheet type B (sheet type ID=2) from the sheet settings management table 810 and generate a sheet setting window 1130 for the sheet type B.

In step S1003, the controller 300 controls the UI control module 352 to display the sheet setting window 1130 on the display device 111.

In step S1004, the operator double-clicks the glossiness/black quality adjustment on the adjustment item list 1132.

In step S1005, when the controller 300 detects a click on an adjustment item in the adjustment item list 1132, the controller 300 determines whether there is a match between the sheet types of sheets set in the sheet feeding deck and the sheet type selected in step S1001. For example, the controller 300 refers to the sheet types of sheets in the sheet cassettes 1 to 5 on the sheet feeding deck setting management table 820 and compares them with the currently selected sheet type B (sheet type ID=2). Because there is not a match between the sheet type IDs, a mismatch is detected. The processing then moves to step S1006. Having described the sheet feeding decks above, an inserter connected subsequently to the fixing unit is excluded from the sheet feeding decks to be determined because it cannot perform confirmation printing for adjustment.

In step S1006, the controller 300 controls the UI control module 352 to generate a confirmation window 1150 in FIG. 11C to be displayed on the display device 111.

The confirmation window 1150 in FIG. 11C will be described. The confirmation window 1150 is a window that, in a case where the sheet type selected in step S1001 is not set any of the sheet feeding decks, prompts to confirm that the currently selected sheet type may be set for one of the sheet feeding decks. Image data of the confirmation window 1150 are rendered in the RAM 302 in accordance with a corresponding instruction from the CPU 301, and the image data rendered in the RAM 302 are output to the display device 111 as a video signal so that the confirmation window 1150 is displayed. The confirmation window 1150 displays a message display area 1151, a selection pull-down menu 1152 for the sheet feeder, a "yes" button 1153, and a "no" button 1154. The controller 300 generates sheet feeding deck options to be displayed in the selection pull-down menu 1152 with reference to the settable sheet feeding deck IDs in the sheet management table 810. An inserter connected subsequently to the fixing unit is excluded from the sheet feeding deck options to be displayed on the selection pull-down menu 1152 because it cannot perform confirmation printing for adjustment.

In step S1007, the controller 300 controls the UI control module 352 to display the confirmation window 1150 in FIG. 11C on the display device 111.

In step S1008, the operator opens the sheet cassette 1 in the image forming apparatus 103 and places a sheet bundle of the sheet type B. The operator closes the sheet cassette 1.

In step S1009, the operator selects the sheet feeding deck for which the sheet type selected in step S1001 is to be set. The sheet cassette 1 is selected here.

In step S1010, the operator sets the currently selected sheet type for the sheet cassette 1 and clicks the "yes" button 1153 to continue the adjustment operation.

Figure 6B:
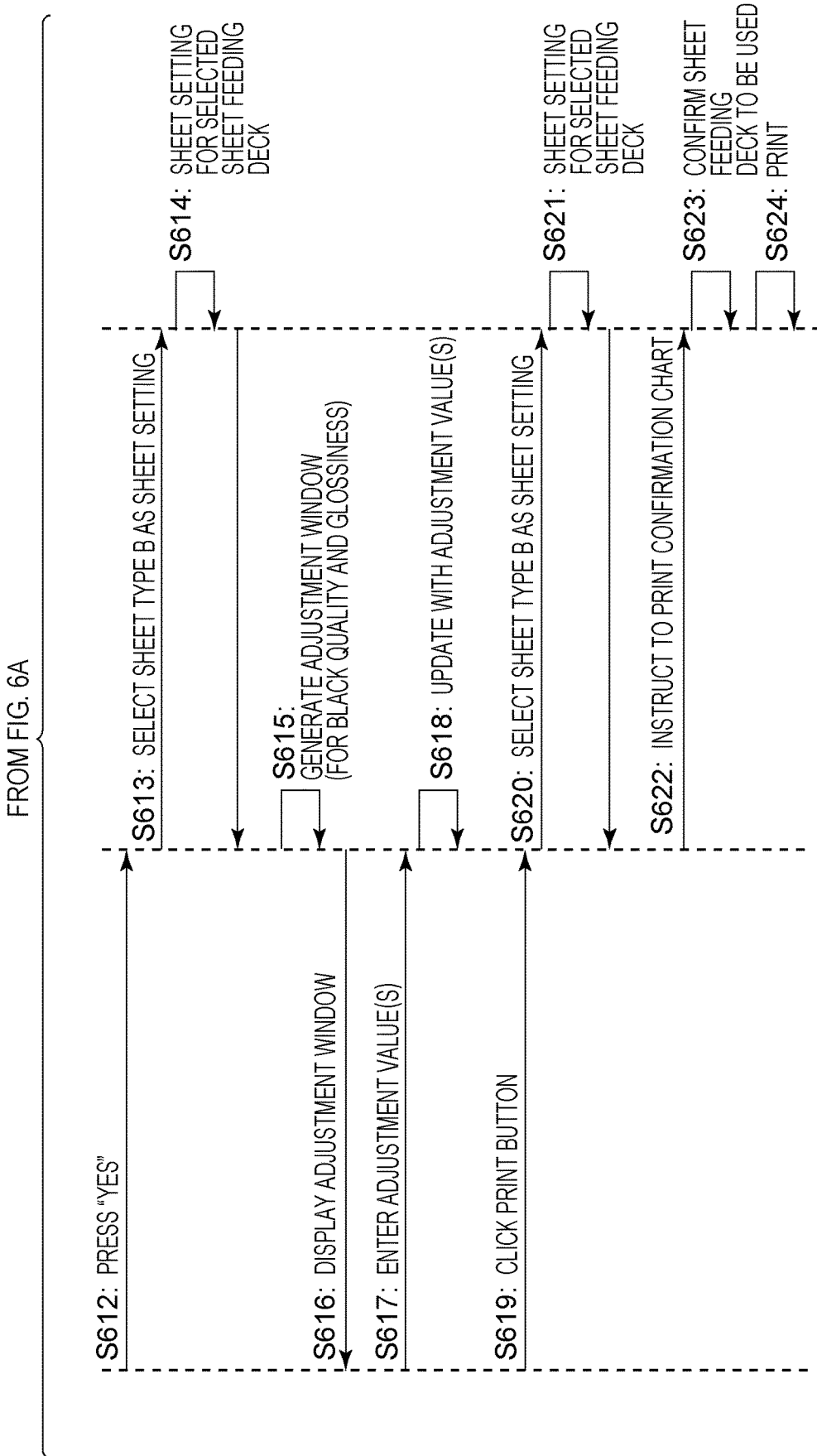

Because the controller 300 performs processing in step S1011 to step S1022 in the same manner as that in step S613 to S624 in FIG. 6B, any repetitive descriptions will be omitted.

Figure 12A:
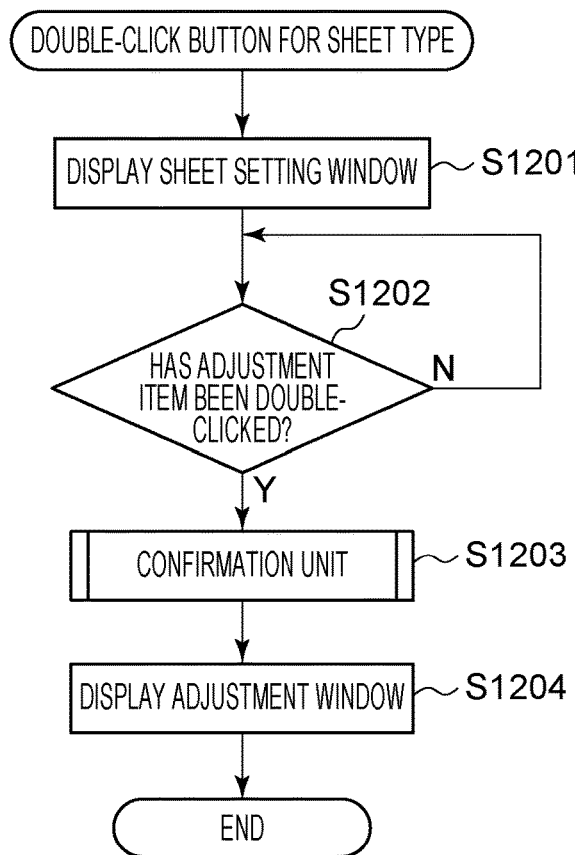
FIGS. 12A and 12B are diagrams illustrating an example of a flowchart representing a processing example according to the second embodiment.

The flow of the processing from step S1001 to S1014 will be described with reference to a flowchart in FIG. 12A.

In step S1201, the controller 300 detects that a sheet feeding deck button 1103 is clicked in the sheet list window 1120. The controller 300 controls the UI control module 352 to display the sheet setting window 1130 for the sheet type B.

In step S1202, the controller 300 detects that the glossiness/black quality adjustment has been double-clicked. If an adjustment item in the adjustment item list 1132 is clicked, the controller 300 advances the processing to step S1203. Until an adjustment item in the adjustment item list 1132 is clicked, the controller 300 controls to keep displaying the sheet setting window 1130 for waiting for an operation on the window.

In step S1203, the controller 300 displays the confirmation window and performs processing by a confirmation unit configured to control whether the currently selected sheet type is to be set for the sheet feeding deck or not.

Figure 12B:
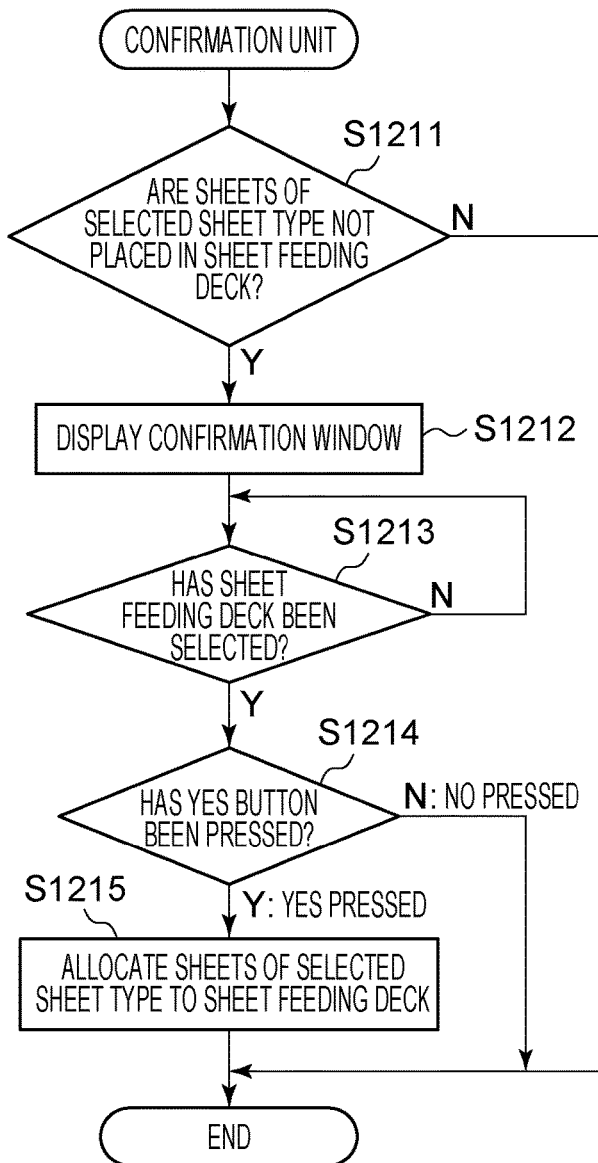

The confirmation unit in step S1203 will be described in detail with reference to FIG. 12B.

In step S1211, the controller 300 determines whether there is a match between the sheet type set for one of the sheet feeding decks and the sheet type selected in step S1001 in FIG. 10A. If there is not a match between the sheet type set for one of the sheet feeding decks and the selected sheet type, the controller 300 advances the processing to step S1212. If there is a match between the sheet type set for one of the sheet feeding decks and the selected sheet type, the controller 300 ends the processing of the confirmation unit. For example, the controller 300 refers to the sheet types for the sheet feeding decks in the sheet feeding deck setting management table 820 and compares them with the currently selected sheet type B (sheet type ID=2). Here, there is not a match in sheet type ID, a mismatch is detected. The processing moves to step S1212.

In step S1212, the controller 300 controls the UI control module 352 to display the confirmation window 1150 in FIG. 11C on the display device 111.

In step 1213, the controller 300 determines whether one of the sheet feeding decks is selected in the selection pull-down menu 1152 for the sheet feeder. If one of the sheet feeding decks is selected, the controller 300 controls the UI control module 352 to cancel the gray-out of the "yes" button 1153. The processing moves to step S1214. If no sheet feeding deck is selected, the controller 300 controls the UI control module 352 to gray-out the "yes" button 1153 and waits for selection of one of the sheet feeding decks. If the selected sheet type cannot be set for any of the sheet feeding decks and the controller 300 detects that the "no" button 1154 has been clicked, the processing of the confirmation unit ends.

Because the controller 300 performs the processing in step S1214 in the same manner as that of the processing in step 913 in FIG. 9B, any repetitive descriptions will be omitted.

In step S1215, the controller 300 controls the sheet management module 353 to obtain information in the sheet settings management table 810 regarding the sheet type B selected in step S1001. The controller 300 controls to generate a sheet setting instruction to register the obtained information with the sheet feeding deck (sheet cassette 1) selected in step S1213. The controller 300 controls the network control module 355 to transmit the sheet setting instruction to the image forming apparatus 103 via the control cable 108 by controlling the LAN controller 306. For example, the controller 300 writes the sheet type ID=2 corresponding to the sheet type B to the sheet type ID area corresponding to the sheet cassette 1 (sheet feeding deck ID=1) on the sheet feeding deck setting management table 820.

Up to this point, the confirmation unit in step 1203 has been described with reference to FIG. 12B. Referring back to FIG. 12A, the subsequent processing will further be described.

In step S1204, the controller 300 controls the UI control module 352 to generate the glossiness/black quality adjustment window 1160 in FIG. 11C to be displayed on the display device 111.

Up to this point, the flow of a series operations has been described including selecting a sheet (sheet type B) not set for any of the sheet feeding decks from the sheet list window 1120 in FIG. 11A, performing adjustment operations without the sheet setting operation, and executing confirmation printing after the adjustment. Thus, the operator may not open a sheet setting window for setting a sheet type but may change the adjustment values and execute confirmation printing after the adjustment on the adjustment window. This improves or refines operator's convenience for performing the sheet setting operations on sheets in a digital multifunction peripheral.

Embodiment 3

In Embodiment 1, though an operator presses the "yes" button 742 on the confirmation window 740 and the adjustment window is displayed, the operator may notice that a wrong sheet type has been selected and want to return the setting to the sheet type originally set for one of the sheet feeding decks.

According to Embodiment 3, when the cancel button 756 is pressed on the adjustment window 750 based on Embodiment 1 in such a case, the sheet setting upon open of the confirmation window 740 is applied again.

According to this embodiment, an example in which an operator selects a sheet type (sheet type B) that is not set for a sheet feeding deck (sheet cassette 1), performs a sheet setting operation and cancelling the setting on an adjustment window will be described with reference to flowcharts in FIGS. 13A and 13B and FIGS. 15A and 15B.

Because the processing from step S1301 to S1311 is performed in the same manner as the processing in step S601 to S611 in FIG. 6A, any repetitive descriptions will be omitted.

In step S1312, an operator sets the currently selected sheet type for the sheet cassette 1 and clicks a "yes" button 1442 in FIG. 14C to continue adjustment operations.

In step S1313, the controller 300 controls the sheet management module 353 to temporarily store information on the sheet type A (sheet type ID=1) set for the current sheet feeding deck (sheet cassette 1) to the RAM 302.

Because the processing in step S314 to S1319 is performed in the same manner as the processing in step S613 to S618 in FIG. 6B, any repetitive descriptions will be omitted.

In step S1320, the operator clicks a cancel button 1456 on the adjustment window 1450.

In step S1321, the controller 300 reads the information on the sheet type A (sheet type ID=1) temporarily stored in the RAM 302.

In step S1322, the controller 300 controls the sheet management module 353 to generate a sheet setting instruction for registering the information on the sheet settings management table 810 regarding the sheet type A read from the RAM 302 with the sheet feeding deck (sheet cassette 1). The controller 300 controls the network control module 355 to transmit the sheet setting instruction to the image forming apparatus 103 via the control cable 108 by controlling the LAN controller 306.

In step S1323, when the controller 200 in the image forming apparatus 103 receives the sheet setting instruction through the LAN controller 206, the controller 200 sets the received sheet information on the sheet type A for the designated sheet feeding deck (sheet cassette 1, here). The controller 300 increments a counter for the usage history of the set sheet type and controls the sheet management module 353 to write the usage history count in the usage history on the sheet settings management table 810 corresponding to the target sheet type ID.

In step S1324, the controller 300 controls the UI control module 352 to obtain the sheet feeding deck setting management table 820 from the sheet feeding deck management module 354. The controller 300 controls the UI control module 352 to generate a sheet setting window 1430 for the sheet cassette 1 based on the obtained sheet feeding deck list.

In step S1325, the controller 300 controls the UI control module 352 to display the sheet setting window 1430 on the display device 111.

Figure 15A:
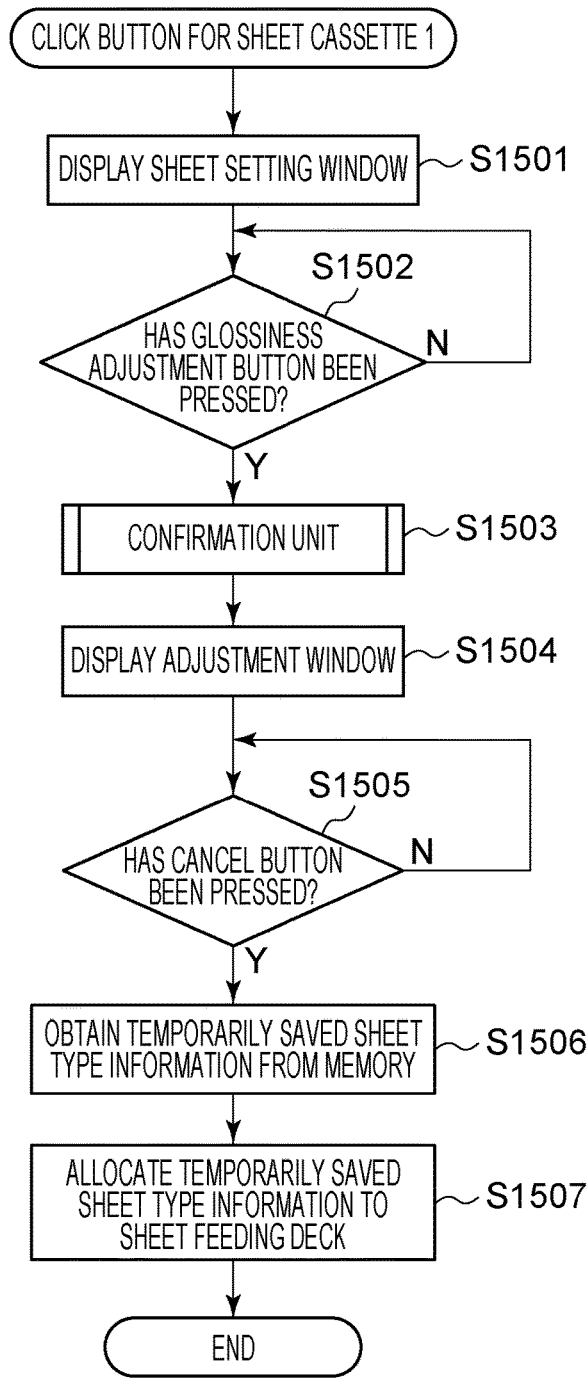
FIGS. 15A and 15B are diagrams illustrating an example of a flowchart representing processing according to the third embodiment.

Next, a flow of processing from step S1301 to S1323 will be described with reference to a flowchart in FIG. 15A.

Because the controller 300 performs processing in step S1501 to S1504 in the same manner as that of step S901 to S904 in FIG. 9A, any repetitive descriptions will be omitted.

Figure 15B:
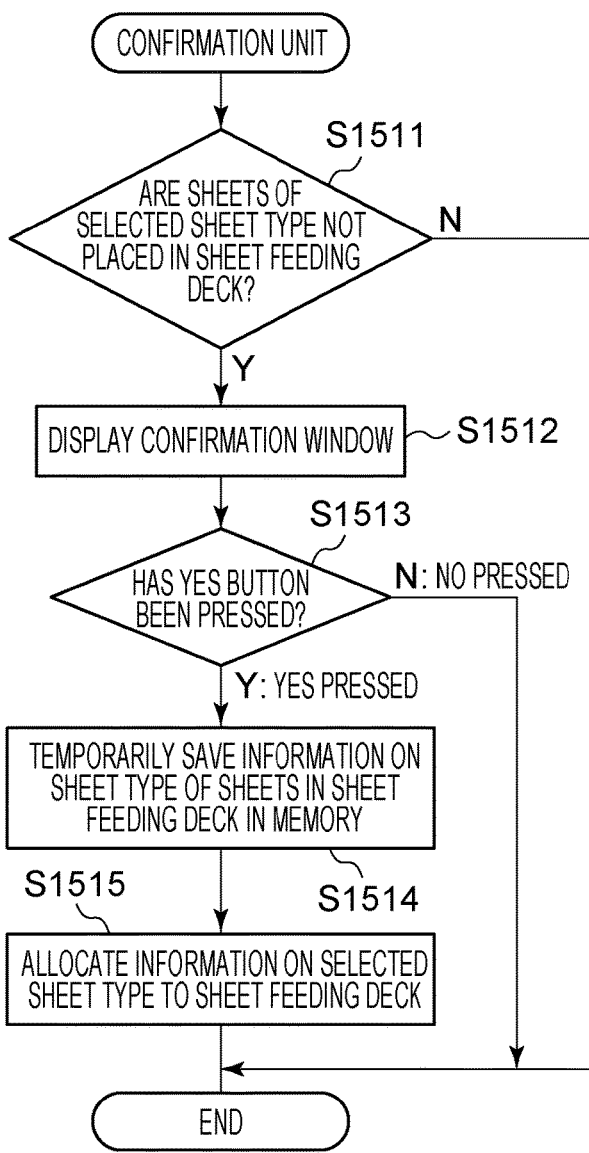

However, because a confirmation unit in step S1503 is different from that in FIG. 9B, it will be described with reference to FIG. 15B.

Because the processing in step S1511 to step S1513 is performed in the same manner as that in FIG. 9B, any repetitive descriptions will be omitted.

In step S1514, the controller 300 controls the sheet management module 353 to temporarily save information on the sheet type A (sheet type ID=1) set for the current sheet feeding deck (sheet cassette 1) in the RAM 302.

In step S1515, the controller 300 controls the sheet management module 353 to generate a sheet setting instruction for registering information in the sheet settings management table 810 regarding the currently selected sheet type B with the sheet feeding deck (sheet cassette 1). The controller 300 controls the network control module 355 to transmit the sheet setting instruction to the image forming apparatus 103 via the control cable 108 by controlling the LAN controller 306. For example, the controller 300 writes the sheet type ID=2 corresponding to the sheet type B to the sheet type ID area corresponding to the sheet cassette 1 (sheet feeding deck ID=1) on the sheet feeding deck setting management table 820.

Up to this point, the confirmation unit in step 1503 has been described with reference to FIG. 15B. The processing will further be described with reference back to FIG. 15A.

In step S1505, the controller 300 determines whether the cancel button 1456 on the adjustment window 1450 has been clicked. If the cancel button 1456 has been clicked, the controller 300 advances the processing to step S1506. If the cancel button 1456 has not been clicked, the controller 300 waits for reception of a click event on one of buttons belonging to the adjustment window 1450.

In step S1506, the controller 300 controls the sheet management module 353 to obtain the information in the sheet settings management table 810 regarding the sheet type A that is read from the RAM 302.

In step S1507, the controller 300 controls the sheet management module 353 to generate a sheet setting instruction to register the information in the sheet settings management table 810 regarding the sheet type A that is read from the RAM 302 with the sheet feeding deck (sheet cassette 1). For example, the controller 300 writes the sheet type ID=1 corresponding to the sheet type A to the sheet type ID area corresponding to the sheet cassette 1 (sheet feeding deck ID=1) on the sheet feeding deck setting management table 820. When the controller 200 in the image forming apparatus 103 receives the sheet setting instruction through the LAN controller 206, the controller 200 sets the received sheet information on the sheet type A for the designated sheet feeding deck (sheet cassette 1, here). The controller 300 increments a counter for the usage history of the set sheet type and controls the sheet management module 353 to write the usage history count in the usage history on the sheet settings management table 810 corresponding to the target sheet type ID. The controller 300 controls the UI control module 352 to close the adjustment window 1450 and a window transition to the sheet setting window 1430 displayed in step S1501 is performed.

Up to this point, the flow of a series of operations has been described including returning to the sheet setting when the confirmation window 1440 is opened if the cancel button 1456 is pressed on the adjustment window 1450 in FIG. 14C. Thus, even when an operator notices selection of a wrong sheet type after performing operations up to the adjustment window 1450 according to Embodiment 1, the operator can easily return a sheet setting change for the sheet feeding deck to the original state. This improves or refines operator's convenience for performing the sheet setting operations on sheets in a digital multi-function peripheral.

The embodiments have been described as follows. The sheet management system including the controller 300 and the image forming apparatus 103 has been disclosed. The controller 300 selects a sheet feeding deck (703).

The controller 300 adjusts sheet information including setting values for print processing to be performed on a sheet to be used for the printing. Examples of the sheet include a paper sheet, an overhead projector (OHP) film, and plastic wrapping paper.

If there is not a match between sheet information set for the sheet feeding deck selected by the controller 300 and sheet information to be adjusted, the controller 300 confirms whether the sheet information to be adjusted is to be set for the currently selected sheet feeding deck. The sheet information 7000 is an example of the sheet information.

In accordance with the result of the confirmation by the controller 300, the controller 300 sets the adjusted sheet information for the image forming apparatus 103.

If the adjustment operation is aborted, the controller 300 may set the sheet information upon display of the adjustment window (730) as the sheet information set for the selected sheet feeding deck.

The controller 300 may set to inhibit to change the sheet information on the sheet to be adjusted during operations from the display of the confirmation window 740 to the change of the sheets in the sheet feeding deck selected by a selection unit.

The controller 300 performs display control to display a plurality of display items corresponding to a plurality of sheet feeding decks. Examples of the display items are the sheet feeding deck buttons 703 to 707.

In accordance with selection of a display item (703) corresponding to one sheet feeding deck from the plurality of display items, the sheet feeding deck is selected by the controller 300.

The controller 300 selects sheet information to be set for the selected sheet feeding deck from a plurality of sheet information pieces (730). The sheet setting window 730 is an example of a window for the sheet information selection.

The controller 300 confirms whether there is a match between the selected sheet information and the sheet information preset for the sheet feeding deck. In accordance with the confirmation result, a predetermined confirmation window (740, 1150) is displayed.

According to one aspect of the present disclosure, the operability for defining a setting relating to sheet information can be improved or refined. According to another aspect of the present disclosure, operations from setting of a desired or predetermined sheet type to confirmation printing after adjustment can be easily performed.

A printing factory that performs small volume printing in great varieties uses many sheet types to be selected in accordance with the ordered product. Accordingly, the operation for setting sheet types and the operation for adjusting information thereon may be frequently performed. For some sheet types, the adjustment operations if any may be repeated to satisfy desired or predetermined print quality. However, the related art assumes that the sheet type to be adjusted if any has already been set for the sheet feeding deck and does not consider a series of adjustment operations including a sheet setting operation when a target sheet type is not set for the sheet feeding deck. For many orders for small volume printing in great varieties, for example, there are increased transitions between operating windows for the sheet setting operations and the adjustment operations, resulting low operability by the operator. In the past for the adjustment operation, a window for sheet setting is operated first, and then a transition to an adjustment window is performed and operations are performed thereon. Therefore, operations up to confirmation printing after the adjustment take time. An aspect of the embodiments achieves improved or refined operability for defining a setting relating to a sheet. Another aspect of the embodiments provides a system that can easily confirm setting states relating to sheet information for a sheet feeding deck after adjusting a desired or predetermined piece of the sheet information.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-125528, filed Jun. 29, 2018, which is hereby incorporated by reference herein in its entirety.

What is claimed is:

1. A system comprising:
at least one processor and at least one memory coupled to each other and cooperating to perform operations including:
selecting a sheet holding unit of an image forming apparatus,
adjusting, as first adjusted sheet information, sheet information of a first sheet to be used for printing, wherein the first sheet information includes setting values for performing print processing on the first sheet,
setting adjusted sheet information and identification information to the selected sheet holding unit, and
confirming whether or not to set the first adjusted sheet information to the selected sheet holding unit in a case where first identification information of the first sheet set to be for the selected sheet holding unit does not agree with second identification information of a second sheet for which second sheet information is preset for the sheet holding unit,
wherein setting includes setting or not setting the first adjusted sheet information to the selected sheet holding unit in accordance with a result of confirming whether or not to set the first adjusted sheet information to the selected sheet holding unit.

2. The system according to claim 1, wherein, in a case where adjusting includes aborting an adjustment operation, sheet information at a point in time of display of an adjustment window is set to the selected sheet holding unit as the sheet information set to the selected sheet holding unit.

3. The system according to claim 1, wherein performed operations further include inhibiting sheet information of the sheet to be adjusted from being changed, from display of a confirmation window until replacement of the sheet of the selected sheet holding unit.

4. The system according to claim 1, wherein selecting includes selecting, from among a plurality of sheets, a sheet to which sheet information is to be adjusted, wherein confirming includes confirming whether to set the adjusted sheet information to the selected sheet holding unit or not in a case where the identification information of the sheet set to the selected sheet holding unit does not agree with identification information of the selected sheet.

5. A method for a system, the method comprising:
selecting a sheet holding unit of an image forming apparatus;
adjusting, as first adjusted sheet information, sheet information of a first sheet to be used for printing, wherein the first sheet information includes setting values for performing print processing on the first sheet;
setting adjusted sheet information and identification information to the selected sheet holding unit; and
confirming whether or not to set the first adjusted sheet information to the selected sheet holding unit in a case where first identification information of the first sheet set to be for the selected sheet holding unit does not agree with second identification information of a second sheet for which second sheet information is preset for the sheet holding unit,
wherein setting includes setting or not setting the first adjusted sheet information to the selected sheet holding unit in accordance with a result of confirming whether or not to set the first adjusted sheet information to the selected sheet holding unit.

6. The method according to claim 5, wherein, in a case where adjustment includes aborting an adjustment operation, sheet information at a point in time of display of an adjustment window is set to the selected sheet holding unit as the sheet information set to the selected sheet holding unit.

7. The method according to claim 5, further comprising inhibiting sheet information of the sheet to be adjusted from being changed, from display of a confirmation window until replacement of the sheet of the selected sheet holding unit.

8. The method according to claim 5,
wherein selecting includes selecting, from among a plurality of sheets, a sheet to which sheet information is to be adjusted,
wherein confirming includes confirming whether to set the adjusted sheet information to the selected sheet holding unit or not in a case where the identification information of the sheet set to the selected sheet holding unit does not agree with identification information of the selected sheet.

* * * * *